United States Patent
Bloom et al.

(10) Patent No.: US 8,588,459 B2
(45) Date of Patent: Nov. 19, 2013

(54) MODIFYING A CODED BITSTREAM

(75) Inventors: Jeffrey Adam Bloom, West Windsor, NJ (US); Dekun Zou, Princeton, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 829 days.

(21) Appl. No.: 12/451,551

(22) PCT Filed: Jun. 13, 2008

(86) PCT No.: PCT/US2008/007441
§ 371 (c)(1),
(2), (4) Date: Nov. 17, 2009

(87) PCT Pub. No.: WO2008/154041
PCT Pub. Date: Dec. 18, 2008

(65) Prior Publication Data
US 2010/0150394 A1    Jun. 17, 2010

Related U.S. Application Data

(60) Provisional application No. 60/934,634, filed on Jun. 14, 2007.

(30) Foreign Application Priority Data

Nov. 2, 2007    (WO) ................ PCT/US2007/023172

(51) Int. Cl.
*G06K 9/00*    (2006.01)

(52) U.S. Cl.
USPC .......................................... 382/100; 382/250

(58) Field of Classification Search
USPC ......... 382/100, 135, 218, 232, 238, 244, 240, 382/246; 380/28, 201; 341/50; 703/22; 715/723; 713/150, 168, 164, 181–194; 726/26–30; 348/509, 589; 358/3.28, 358/500, 426.04, 400, 539
See application file for complete search history.

(56) References Cited

U.S. PATENT DOCUMENTS

| | | | |
|---|---|---|---|
| 4,939,515 A | 7/1990 | Adelson |
| 5,530,751 A | 6/1996 | Morris |

(Continued)

FOREIGN PATENT DOCUMENTS

| | | |
|---|---|---|
| CA | 2692456 | 1/2009 |
| EP | 0928110 | 7/1999 |

(Continued)

OTHER PUBLICATIONS

Ingemar J. Cox, et al., "Secure Spread Spectrum Watermarking for Multimedia", IEEE Transactions on Image Processing, Dec. 1997, pp. 1673-1687, vol. 6, No. 12.

(Continued)

*Primary Examiner* — Hadi Akhavannik
*Assistant Examiner* — Mehdi Rashidian
(74) *Attorney, Agent, or Firm* — Robert D. Shedd; Brian J. Dorini

(57) ABSTRACT

Various implementations are provided for, for example, determining watermarking data, performing the watermarking, and processing watermarked data. At least one implementation watermarks AVC bitstream that uses CAVLC entropy coding. The watermarking data may be determined in a pre-processing stage and stored for later use in watermark a bitstream. One method accesses variable-length encoded data including an encoding of information identifying an actual reference used to predictively encode an image. The encoding of the information has a particular value. The method determines an alternative value that is different from the particular value, such that the alternative value is an encoding of alternative information that identifies a different reference from the actual reference. The alternative value is for use in watermarking the variable-length encoded data.

56 Claims, 12 Drawing Sheets

(56) References Cited

U.S. PATENT DOCUMENTS

| | | | |
|---|---|---|---|
| 5,530,759 A | 6/1996 | Braudaway | |
| 5,574,567 A | 11/1996 | Cookson et al. | |
| 5,636,292 A | 6/1997 | Rhoads | |
| 5,646,997 A | 7/1997 | Barton | |
| 5,664,018 A | 9/1997 | Leighton | |
| 5,687,191 A | 11/1997 | Lee et al. | |
| 5,687,236 A | 11/1997 | Moskowitz et al. | |
| 5,710,834 A | 1/1998 | Rhoads | |
| 5,721,788 A | 2/1998 | Powell et al. | |
| 5,734,752 A | 3/1998 | Knox | |
| 5,748,783 A | 5/1998 | Rhoads | |
| 5,809,139 A | 9/1998 | Girod et al. | |
| 5,819,289 A * | 10/1998 | Sanford et al. | 1/1 |
| 5,960,081 A | 9/1999 | Vynne et al. | |
| 6,154,571 A * | 11/2000 | Cox et al. | 382/250 |
| 6,208,745 B1 | 3/2001 | Florencio et al. | |
| 6,282,300 B1 | 8/2001 | Bloom et al. | |
| 6,332,194 B1 | 12/2001 | Bloom et al. | |
| 6,411,725 B1 | 6/2002 | Rhoads | |
| 6,621,933 B2 | 9/2003 | Chung et al. | |
| 6,687,384 B1 | 2/2004 | Isnardi | |
| 6,717,535 B2 * | 4/2004 | Furuta | 341/67 |
| 6,785,332 B1 | 8/2004 | Kutter et al. | |
| 6,834,345 B2 | 12/2004 | Bloom et al. | |
| 6,909,784 B1 * | 6/2005 | Sugahara | 380/201 |
| 6,978,370 B1 | 12/2005 | Kocher | |
| 7,113,615 B2 | 9/2006 | Rhoads et al. | |
| 7,277,587 B2 | 10/2007 | Sun | |
| 7,437,721 B2 | 10/2008 | Watson et al. | |
| 7,636,440 B2 | 12/2009 | Weirauch | |
| 7,769,088 B2 | 8/2010 | Prakasam et al. | |
| 7,853,124 B2 | 12/2010 | Ramaswamy et al. | |
| 8,046,580 B2 * | 10/2011 | Taylor | 713/168 |
| 8,064,518 B2 * | 11/2011 | Maeda | 375/240.12 |
| 8,094,877 B2 * | 1/2012 | Sharma et al. | 382/100 |
| 8,127,137 B2 * | 2/2012 | Levy | 713/176 |
| 8,161,463 B2 * | 4/2012 | Johnson et al. | 717/136 |
| 8,358,703 B2 | 1/2013 | Zou et al. | |
| 2001/0017885 A1 | 8/2001 | Asai et al. | |
| 2002/0015509 A1 | 2/2002 | Nakamura et al. | |
| 2002/0129253 A1 * | 9/2002 | Langelaar | 713/176 |
| 2003/0016756 A1 * | 1/2003 | Steenhof et al. | 375/240.25 |
| 2003/0033529 A1 | 2/2003 | Ratnakar et al. | |
| 2003/0072467 A1 | 4/2003 | Brundage et al. | |
| 2003/0185417 A1 | 10/2003 | Alattar et al. | |
| 2004/0001611 A1 | 1/2004 | Celik et al. | |
| 2004/0120404 A1 * | 6/2004 | Sugahara et al. | 375/240.23 |
| 2004/0151313 A1 | 8/2004 | Weirauch | |
| 2005/0021539 A1 | 1/2005 | Short et al. | |
| 2005/0240767 A1 | 10/2005 | Lemma et al. | |
| 2006/0020809 A1 | 1/2006 | Hayashi | |
| 2006/0095253 A1 | 5/2006 | Schuller et al. | |
| 2006/0227873 A1 | 10/2006 | Toebes et al. | |
| 2006/0257000 A1 | 11/2006 | Boyce et al. | |
| 2007/0053438 A1 | 3/2007 | Boyce et al. | |
| 2007/0080832 A1 | 4/2007 | Yang et al. | |
| 2008/0212824 A1 | 9/2008 | Braudaway et al. | |
| 2008/0260028 A1 | 10/2008 | Lamy-Bergot | |
| 2009/0080689 A1 | 3/2009 | Zhao et al. | |
| 2009/0219987 A1 | 9/2009 | Base et al. | |
| 2009/0290750 A1 | 11/2009 | Tapson et al. | |
| 2010/0020876 A1 | 1/2010 | Jeon et al. | |
| 2010/0027684 A1 | 2/2010 | Zou et al. | |
| 2010/0169349 A1 | 7/2010 | Zou et al. | |

FOREIGN PATENT DOCUMENTS

| | | |
|---|---|---|
| JP | 2003-319166 | 11/2003 |
| JP | 2006-99780 | 4/2006 |
| KR | 10-2011-0050456 | 2/2010 |
| WO | 96/21290 | 7/1996 |
| WO | WO-2006041145 | 4/2006 |
| WO | 2006067172 | 6/2006 |
| WO | WO-2007067168 | 6/2007 |
| WO | WO-2007122216 | 11/2007 |
| WO | 2009/005494 A1 | 8/2008 |
| WO | 2008/118145 A1 | 10/2008 |
| WO | 2008/118146 A1 | 10/2008 |

OTHER PUBLICATIONS

Christopher Dautzenberg, "Watermarking Images", Department of Microelectronics and Electrical Engineering, Oct. 1994, pp. 1-47, Trinity College, Dublin.

E. Koch, et al., "Towards Robust and Hidden Image Copyright Labeling", Proc. of 1995 IEEE Workshop on Nonlinear Signal and Image Processing, Jun. 1995, pp. 1-4, Marmaras, Greece.

F. Goffin, et al., "A Low Cost Perceptive Digital Picture Watermarking Method", Laboratoire de Telecommunications et Teledetection, 14 pages, Batiment Stevin.

Dawen Xu, et al., "Watermarking in H.264/AVC compressed domain using Exp-Golomb code words mapping", Optical Engineering, Sep. 2011, pp. 097402-1-097402-11, vol. 50(9), Ningbo University of Technology, China.

Adrian Tudoroiu, et al., "Block Map Implementation of Difference Expansion Reversible Watermarking", Faculty of Electrical Engineering, 2 pages, Valahia University of Targoviste, Romania.

Jyotsna Singh, et al., "MPEG-2 Video Watermarking using Quantization Index Modulation", IEEE, Netaji Subhas Institute of Technology, 2010, 6 pages, New Delhi, India.

Dekun Zou, et al., "H.264 Stream Replacement Watermarking with Cabac Encoding", IEEE, 2010, pp. 117-121, Technicolor Corporate Research and Dialogic Media Labs.

Da-Wen Xu, et al., "Low Complexity Video Watermarking Algorithm by Exploiting CAVLC in H.264/AVC", IEEE, 2010, pp. 411-415, China.

Xiang Wang, et al., "Efficient Generalized Integer Transform for Reversible Watermarking", IEEE Signal Processing Letters, Jun. 2010, 4 pages, vol. 17, No. 6.

Dekun Zou, et al., "H.264/AVC Substitution Watermarking: A CAVLC Example", Thomson Corporate Research, 2008, 12 pages, Princeton, New Jersey.

Office Action for U.S. Appl. No. 12/450,200 mailed Sep. 19, 2011.
Office Action for U.S. Appl. No. 12/450,343 mailed Jun. 13, 2011.
Office Action for U.S. Appl. No. 12/450,343 mailed Nov. 14, 2011.
Dell, Inc., "Blue-Ray Disc Next-Generation Optical Storage: Protecting Content on the BD-ROM", Oct. 2006, pp. 1-6.

Gerrit C. Langelaar, et al., "Real-time Labeling of MPEG-2 Compressed Video", Faculty of Information and Technology Systems (ITS), pp. 1-30, Delft, The Netherlands.

Raymond B. Wolfgang, et al., "Perceptual Watermarks for Digital Images and Video", Proceedings of the IEEE, Jul. 1999, pp. 1108-1126, vol. 87, No. 7.

W. Bender, et al., "Techniques for data hiding", IBM Systems Journal, 1996, pp. 313-335, vol. 35, Nos. 3&4.

Young-Ho Seo, et al., A Blind Watermarking Algorithm Using CABAC for H.264/AVC Main Profile, Journal of the Korea Information & Communications Society, Feb. 2007, pp. 1-16, vol. 32, No. 2.

Jun Zhang, et al., Embedding Watermark in MPEG Video Sequence, IEEE, 2001, pp. 535-540, Department of Electronics, JingDeZhen Ceramic College, Jiangxi, China.

Wiegands et al.: "Overview of the H.264/AVC Video Coding Standard," IEEE Transactions on Circuits and Systems for Video Technology, vol. 13, No. 7, Jul. 2003, pp. 560-576.

Nguyen et al.: "A Fast Watermarking System for H.264/AVC Video," IEEE, APCCAS, 2006, pp. 81-84.

Ozbek et al.: "A Survey on the H.264/AVC Standard," Turk J Elec Engin, vol. 13, No. 3, 2005, pp. 287-302.

Richardson: "H.264 and MPEG-4 Video Compression," Video Coding for Next-generation Multimedia, Wiley, 2003.

Cox et al.: "Digital Watermarking and Steganography," Second Edition, Elsevier, 2008, Morgan Kaufmann Publisher.

Zou et al.: "H.264 Video Encryption Scheme Adaptive to DRM," IEEE, 2006, pp. 1289-1297.

Zou et al.: "H.264/AVC Stream Replacement Technique for Video Watermarking," Thomson Corporate Research, ICASSP 2008, IEEE, 2008, pp. 1749-1452.

(56) References Cited

OTHER PUBLICATIONS

Noorkami et al.: "Compressed-Domain Video Watermarking for H.264," IEEE, Center for Signal and image Processing, Georgia Institute of Technology, 2005.

Noorkami et al.: "Towards Robust Compressed-Domain Video Watermarking for H.264," School of ECE, Georgia Institute of Technology, Atlanta, GA, 2006.

Mobasseri et al.: "Authentication of H.264 Streams by Direct Watermarking of CAVLC Blocks," Department of Electrical and Computer Engineering, Villanova University, Villanova, PA, 2007.

Marpe et al.: "Context-Based Adaptive Binary Arithmetic Coding in the H.264/AVC Compression Standard," IEEE Transactions on circuits and Systems for Video Technology, vol. 13, No. 7, Jul. 2003, pp. 620-636.

Witten et al.: "Arithmetic Coding for Data Compression," Computing Practices, Communications of the ACM, vol. 30, No. 6, Jun. 1987, pp. 520-540.

Zhou et al.: "A Fragile Watermark Error Detection Scheme for JVT," State Key Lab of Microwave and Digital Communications Department of Electrical Engineering, Tsinghua University, Beijing, China, IEEE, 2003, pp. II-936-II-958.

International Telecommunication Union, "Advanced Video Coding for Generic Audiovisual Services," International Telecommunication Union, ITU-T, H.264,Series H: Audiovisual Multimedia Systems, Mar. 2005, pp. I-325.

Kim et al.: "An Entropy Masking Model for Multimedia Content Watermarking," Proceedings of the $37^{th}$ Hawaii International Conference on System Science, IEEE, 2004, pp. 1-6.

Liu et al.: "A MPEG-2 Video Watermarking Algorithm with Compensation in Bit Stream," DRMTICS 2006, LNCS 3919, pp. 123-134, 2006.

Hartung et al.: "Digital Watermarking of MPEG-2 Coded Video in the Bitstream Domain," IEEE, Telecommunications Institute, University of Erlangen-Nuremberg, 1997, pp. 2621-2624.

Search Report Sep. 19, 2008.

Dawen Xu, et al., "Watermarking in H.264/AVC compressed domain using Exp-Golomb code words mapping", Optical Engineering, Sep. 2011, 11 pages, vol. 50(9), Ningbo, China.

Sakazawa et al., "H.264 Native Video Watermarking Method, Circuits and System", ISCAS 2006 Proceedings, 2006 IEEE International Symposium, May 21-26 2006, pp. 1439-1442.

Lian et al., "Secure Advanced Video Coding Based on Selective Encryption Algorithms", IEEE Transactions on Computer Electronics, May 1, 2006.

\* cited by examiner

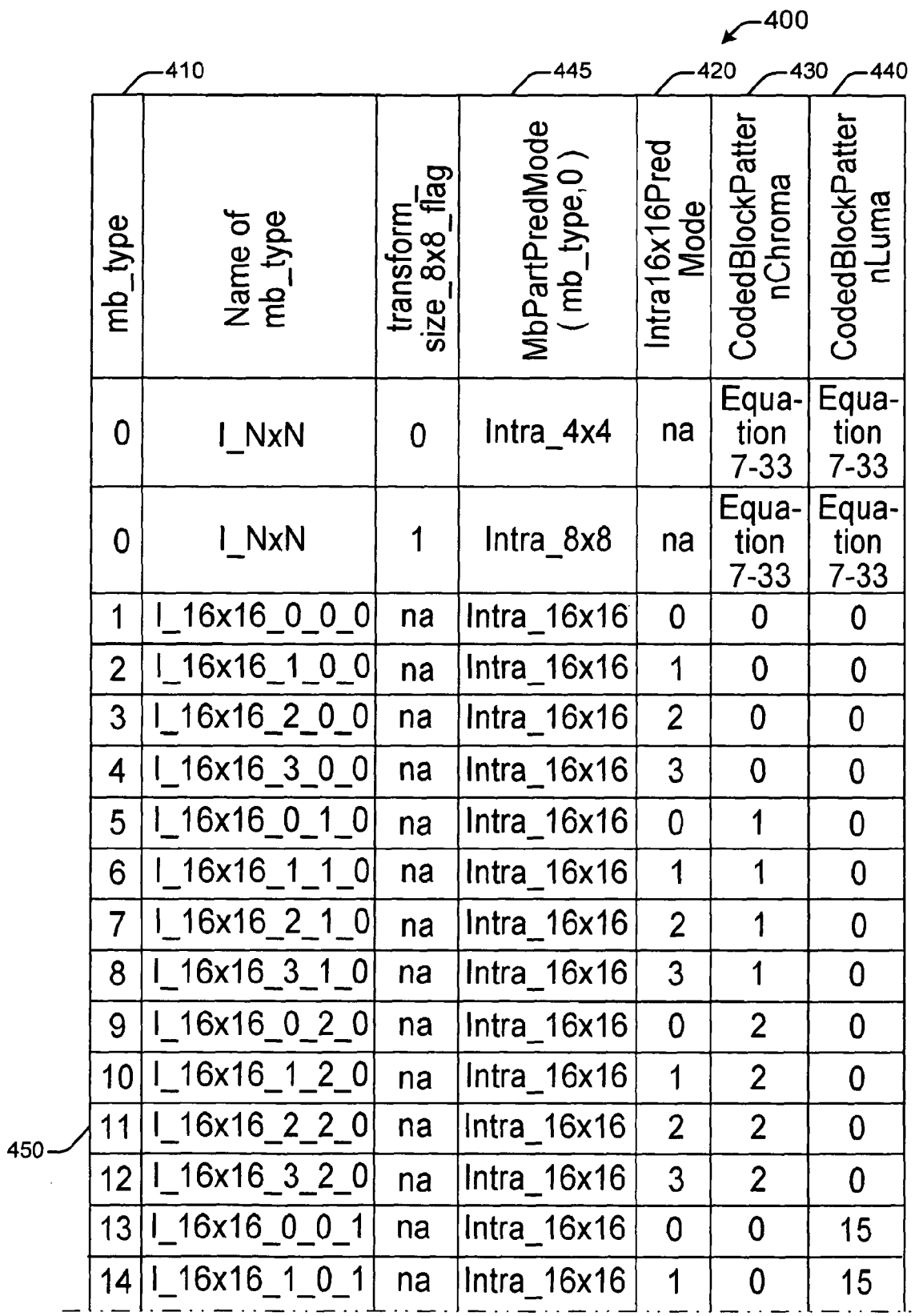

| mb_type | Name of mb_type | transform_size_8x8_flag | MbPartPredMode (mb_type,0) | Intra16x16PredMode | CodedBlockPatternChroma | CodedBlockPatternLuma |
|---|---|---|---|---|---|---|
| 0 | I_NxN | 0 | Intra_4x4 | na | Equation 7-33 | Equation 7-33 |
| 0 | I_NxN | 1 | Intra_8x8 | na | Equation 7-33 | Equation 7-33 |
| 1 | I_16x16_0_0_0 | na | Intra_16x16 | 0 | 0 | 0 |
| 2 | I_16x16_1_0_0 | na | Intra_16x16 | 1 | 0 | 0 |
| 3 | I_16x16_2_0_0 | na | Intra_16x16 | 2 | 0 | 0 |
| 4 | I_16x16_3_0_0 | na | Intra_16x16 | 3 | 0 | 0 |
| 5 | I_16x16_0_1_0 | na | Intra_16x16 | 0 | 1 | 0 |
| 6 | I_16x16_1_1_0 | na | Intra_16x16 | 1 | 1 | 0 |
| 7 | I_16x16_2_1_0 | na | Intra_16x16 | 2 | 1 | 0 |
| 8 | I_16x16_3_1_0 | na | Intra_16x16 | 3 | 1 | 0 |
| 9 | I_16x16_0_2_0 | na | Intra_16x16 | 0 | 2 | 0 |
| 10 | I_16x16_1_2_0 | na | Intra_16x16 | 1 | 2 | 0 |
| 11 | I_16x16_2_2_0 | na | Intra_16x16 | 2 | 2 | 0 |
| 12 | I_16x16_3_2_0 | na | Intra_16x16 | 3 | 2 | 0 |
| 13 | I_16x16_0_0_1 | na | Intra_16x16 | 0 | 0 | 15 |
| 14 | I_16x16_1_0_1 | na | Intra_16x16 | 1 | 0 | 15 |

| 15 | I_16x16_2_0_1 | na | Intra_16x16 | 2 | 0 | 15 |
| 16 | I_16x16_3_0_1 | na | Intra_16x16 | 3 | 0 | 15 |
| 17 | I_16x16_0_1_1 | na | Intra_16x16 | 0 | 1 | 15 |
| 18 | I_16x16_1_1_1 | na | Intra_16x16 | 1 | 1 | 15 |
| 19 | I_16x16_2_1_1 | na | Intra_16x16 | 2 | 1 | 15 |
| 20 | I_16x16_3_1_1 | na | Intra_16x16 | 3 | 1 | 15 |
| 21 | I_16x16_0_2_1 | na | Intra_16x16 | 0 | 2 | 15 |
| 22 | I_16x16_1_2_1 | na | Intra_16x16 | 1 | 2 | 15 |
| 23 | I_16x16_2_2_1 | na | Intra_16x16 | 2 | 2 | 15 |
| 24 | I_16x16_3_2_1 | na | Intra_16x16 | 3 | 2 | 15 |
| 25 | I_PCM | na | na | na | na | na |

FIG. 4b

| Big string form | Range of codeNum |
|---|---|
| 1 | 0 |
| $0\ 1\ x_0$ | 1-2 |
| $0\ 0\ 1\ x_1\ x_0$ | 3-6 |
| $0\ 0\ 0\ 1\ x_2\ x_1\ x_0$ | 7-14 |
| $0\ 0\ 0\ 0\ 1\ x_3\ x_2\ x_1\ x_0$ | 15-30 |
| $0\ 0\ 0\ 0\ 0\ 1\ x_4\ x_3\ x_2\ x_1\ x_0$ | 31-62 |
| ... | ... |

MODIFYING A CODED BITSTREAM

CROSS-REFERENCE TO RELATED APPLICATIONS

This application claims the benefit, under 35 U.S.C. §365 of International Application PCT/US2008/007441 filed Jun. 13, 2008 which was published in accordance with PCT Article 21(2) on Dec. 18, 2008 in English and which claims the benefit of U.S. provisional patent application No. 60/934,634 filed Jun. 14, 2007 and PCT Application PCT/US2007/023172 filed Nov. 2, 2007.

BACKGROUND

1. Technical Field

At least one implementation described herein relates to coding.

2. Description of the Prior Art

Watermarking typically involves modifying a portion of data in such a way that the watermark can be detected at a later time. Various different types of data can be watermarked, including coded data. However, coding schemes are advancing and existing mechanisms for modifying coded data may not provide desired watermarking capabilities for such advancing coding schemes.

SUMMARY

According to a general aspect, variable-length encoded data is accessed that includes an encoding of information identifying an actual reference used to predictively encode an image, the encoding of the information having a particular value. An alternative value is determined that is different from the particular value, such that the alternative value is an encoding of alternative information that identifies a different reference from the actual reference. The alternative value is for use in watermarking the variable-length encoded data.

According to another general aspect, an entropy decoder is for decoding variable-length encoded data including an encoding of information identifying an actual reference used to predictively encode an image. The encoding of the information has a particular value. A watermark generator is coupled to the entropy decoder and is for determining an alternative value that is different from the particular value, such that the alternative value is an encoding of alternative information that identifies a different reference from the actual reference. The alternative value is for use in watermarking the variable-length encoded data.

According to another general aspect, watermark data is for use in watermarking variable-length encoded data that includes an encoding of information identifying an actual reference used to predictively encode an image. The encoding of the information has a particular value. The watermark data includes an alternative value that is different from the particular value, such that the alternative value is an encoding of alternative information that identifies a different reference from the actual reference. The alternative value is a substitute for the particular value for use in watermarking the variable-length encoded data.

According to another general aspect, variable-length encoded data is accessed that includes an encoding of information identifying an actual reference used to predictively encode an image. The encoding of the information has a particular value. An alternative value is accessed that is different from the particular value, such that the alternative value is an encoding of alternative information that identifies a different reference from the actual reference. The alternative value is inserted into the variable-length encoded data as a substitute for the particular value to watermark the image.

According to another general aspect, variable-length encoded data is for an encoding of an image. The variable-length encoded data includes an encoding of information identifying an alternative reference that is different from the actual reference used to predictively encode the image. The information identifying the alternative reference provides a watermark for the image.

According to another general aspect, variable-length encoded data for an encoding of an image is decoded. The variable-length encoded data includes an encoding of information identifying an alternative reference that is different from an actual reference used in predictively encoding the image. The information identifying the alternative reference provides a watermark for the image.

According to another general aspect, a pixel-domain image includes a detectable feature arising from a watermark of a variable-length encoding of one or more syntax elements from a predictive encoding of the image. The variable-length encoding included an encoding of information identifying an alternative reference that is different from an actual reference used in predictively encoding the image. The information identifying the alternative reference provided the watermark for the image.

According to another general aspect, a predictive encoding of a watermarked version of an image is variable-length encoded. The variable-length encoded data includes an indicator of a current reference used in encoding the watermarked version of the image and an indicator of a resulting residue. The watermarked version of the image has a detectable characteristic that provides a watermark. The detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

According to another general aspect, information is accessed that identifies a location in variable-length encoded data at which a variable-length encoding of information is located. The information identifies one of at least two references associated with a predictive encoding of an image. The encoding of the information is accessed at the location in the variable-length encoded data. It is determined, based on the encoding of the information, which of the at least two references is identified. Payload information is determined based on a result of determining which of the at least two references is identified.

According to another general aspect, a pixel-domain image is accessed that includes a detectable feature arising from a watermark of a variable-length encoding of one or more syntax elements from a predictive encoding of the image. The variable-length encoding included an encoding of information identifying an alternative reference that is different from an actual reference used in predictively encoding the image. The information identifying the alternative reference provided the watermark for the image. Detection metadata is accessed that indicates a location in the pixel-domain image at which the detectable feature is located. The pixel-domain image at the location is analyzed to determine a value for the detectable feature. Additional detection metadata is accessed that indicates a comparison value for the detectable feature. The determined value for the detectable feature is compared with the comparison value. Payload information is determined based on a result of the comparing.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 4 is a table showing macroblock types for one particular standard, and showing additional information that is determined by the macroblock types.

DETAILED DESCRIPTION

Figure 1:
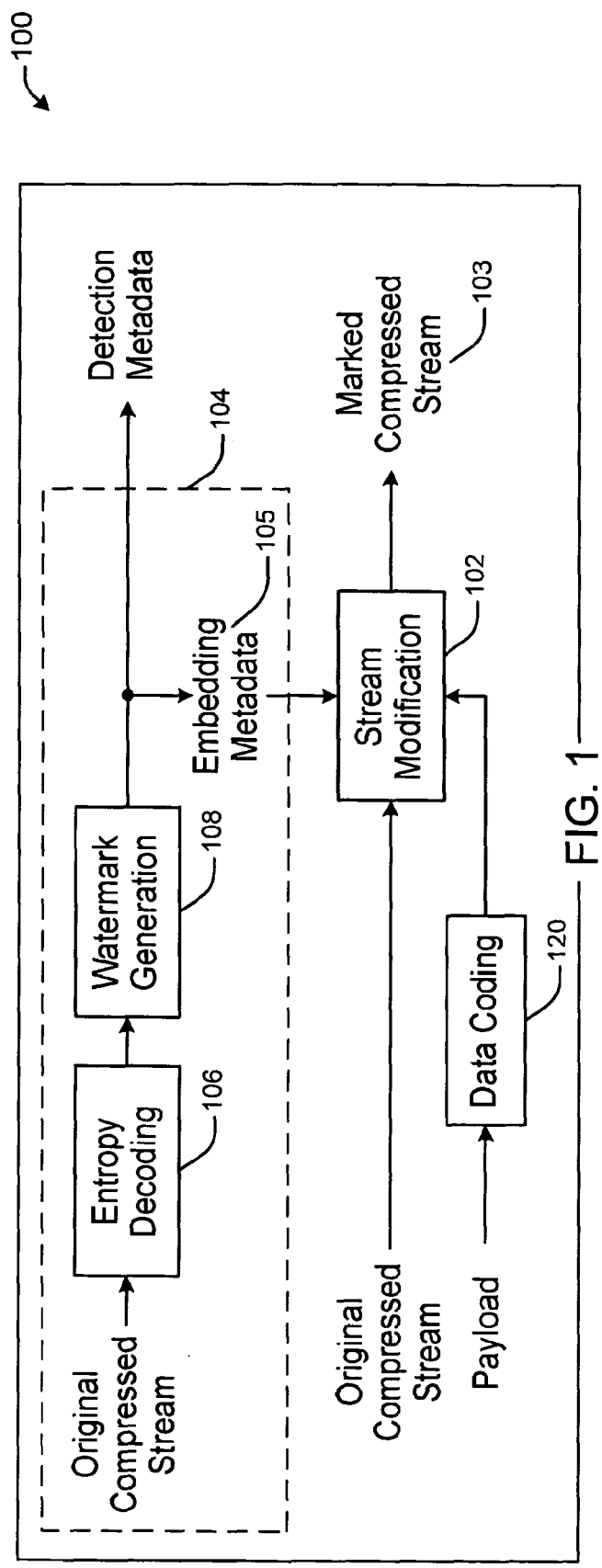
FIG. 1 is a block diagram of an implementation for watermarking an entropy-coded stream.

There are multimedia watermarking applications in which a watermark embedder must directly modify an entropy-encoded bitstream to obtain a watermarked bitstream that remains compliant with both the entropy coding scheme and the underlying data format (i.e. compression standard). It is often also required that the watermarking process must not introduce perceptible artifact in the multimedia data and that the embedded payload be recoverable even after decompression and processing. For many applications the watermark embedding process can have access to some embedding metadata which is typically precomputed in an analysis or pre-processing stage. At least one implementation described herein relates to the embedding process, the generation of such embedding metadata for that embedding process, and the recovery of the embedded payload for that embedding process.

At least one implementation provides a watermark to an H.264/MPEG-4 AVC bitstream by modifying an entropy encoded bitstream directly without requiring entropy decoding and entropy re-encoding. The modification provides the watermark. In one such implementation, the entropy code is a coding scheme known as Context-based Adaptive Variable Length Coding (CAVLC), which is widely used in the H.264/MPEG-4 AVC standard ("AVC").

AVC is also referenced as the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation. CAVLC may also be used in extensions to the AVC standard. A first such extension is a scalable video coding ("SVC") extension (Annex G) referred to as H.264/MPEG-4 AVC, scalable video coding extension (the "SVC extension"). A second such extension is a multi-view video coding ("MVC") extension (Annex H) referred to as H.264/MPEG-4 AVC, MVC extension (the "MVC extension").

In at least one implementation involving AVC, a macroblock is prediction encoded and the syntax elements of the prediction encoding are subsequently entropy encoded using CAVLC. For intra-prediction, as opposed to inter-prediction, a macroblock is prediction encoded without recourse to another picture. That is, without using a reference picture. Instead, the macroblock is prediction encoded with respect to itself or to another macroblock within the same picture (a picture may be, for example, a frame or field). One of the syntax elements for intra-predicted macroblocks is the macroblock type, which indicates the intra-prediction mode as well as other information. In at least one implementation, the macroblock type (the "old" macroblock type) for a macroblock is changed to a new macroblock type such that a different intra-prediction mode is indicated for a particular 16×16 macroblock. However, all other information indicated by the old macroblock type is left unchanged. Further, the new macroblock type (the syntax element) is CAVLC encoded using the same number of bits used to encode the old macroblock type.

The above change in macroblock types can be done to embed a watermark into the data. Further, the determination of the replacement macroblock type and corresponding replacement CAVLC bits can be done off-line, and then at a later time(s) when the content (for example, the video data) is accessed, the replacement of the CAVLC bits can be done in an efficient real-time manner that does not require entropy-decoding. Other implementations, however, perform all or part of the replacement after entropy decoding has been performed, either during the process of determining the replacement information, or in a subsequent stage.

In many applications there is an increasing market need for watermarking of a compressed video stream. Early approaches decompressed the stream, applied the watermarking in the pixel domain, and then recompressed the now-modified pixel domain data. An early advance was to use information from the original compressed stream to simplify the recompression. This was improved with techniques that partially decompress the stream by applying entropy decoding and parsing of the coded bitstream. After entropy decoding, the watermarking algorithms worked directly on syntax elements such as coefficients and motion vectors. After the stream was modified to represent the watermark data, the entropy coding was applied. We describe various implementations in this disclosure, at least some of which apply the watermarking on an entropy encoded bitstream directly without the entropy decode and re-encode steps.

Watermarking a CAVLC stream according to at least some of the described implementations involves changing a coded syntax element in the CAVLC stream. In general, changing a coded syntax element will cause the coded bit length to change. At least one implementation addresses the case in which the coded bit length is held constant, but other implementations allow the coded bit length to vary.

At least part of this disclosure focuses on how to generate metadata for a streaming watermark embedder. At least one implementation changes the Intra-prediction mode, and is robust to various modifications of the bitstream. Other implementations may modify the CAVLC encoding of residue coefficients. One advantage of modifying the Intra-prediction mode is that by changing a relatively few number of bits (for example, 7 bits in an implementation described below) in a CAVLC bitstream, a large and detectable (although not perceptible) change can be provided for a given block. Such a change can also be designed so that it is robust to changes in the coded bitstream. For example, if the coded bitstream is decoded and then re-encoded using different parameters (for example, block sizes, or modes for individual blocks), the bitstream will potentially be completely different but the original changes can still be expected to be detected by analyzing the decoded pixel values.

A brief discussion of CAVLC and Watermarking is provided to assist in the understanding of various implementations. These discussions are often specific. However, these discussions are not intended to be complete and, further, every detail in these discussions may not necessarily apply to all implementations described in this application. Additionally, these discussions include much material that is known to those of skill in the art. However, these discussions will invariably include material, or the organization of material, that is novel, even though such instances might not be pointed out specifically. These discussions are not intended to limit the breadth of the application. Rather, these discussions provide one or more specific contexts, of many possible contexts, to assist the reader in understanding the implementations.

We now provide a discussion of CAVLC. The final step in many video compression methods is the lossless entropy coding of the compressed data. In AVC, CAVLC is commonly used for entropy coding. CAVLC is a well known coding technique and is part of a class of coding techniques referred to as variable length codes. In general, variable length codes, in contrast for example to fixed length codes, assign codewords of shorter length to syntax element values that have, or are expected to have, a higher rate of occurrence. CAVLC generally provides a separate assignment, between codewords and syntax element values, for each type of syntax element. Variable length codes are a class of codes that falls within the family of entropy codes. Arithmetic codes, including CABAC (Context-based Adaptive Binary Arithmetic Coding), is another class of codes that falls within the family of entropy codes.

We now present a short discussion of the general field of watermarking and the more specific area within this field in which one or more described implementations apply. Those of ordinary skill in the art of watermarking will be familiar with much of the information presented here.

The phrase "digital watermarking", as used herein, typically refers to methods that modify a work of art (typically an image, motion image sequence, or audio clip) according to some payload data, such that the following conditions are satisfied:

1. The modified version of the work is perceptually indistinguishable to the original version of the work, and
2. The payload data can be recovered from the modified version of the work at a later time.

A subclass of digital watermarking methods, referred to as "robust digital watermarking", introduces a third condition:

3. The payload data can be recovered from a distorted version of the modified version of the work, where the distortion may have been introduced by common signal processing and signal handling to which the modified work may have subjected (for example, compression, noise reduction filtering, color enhancements) or the distortion may have been introduced intentionally by an adversary attempting to render the payload data unrecoverable.

There are many applications of robust digital watermarking including, but not limited to, the following:

1. Owner Identification: the watermark payload identifies the owner of a work.
2. Copy Control: the watermark payload indicates a copyright associated with a work. Devices for viewing, duplicating, recording, printing, distributing, or any other action can recover the payload data and restrict action to those allowed by the copyright.
3. Transaction Tracking: the watermark payload identifies the recipient to whom the copy of a work was legitimately distributed. This can be useful when the legitimate recipients do not receive the rights to further distribute the work. If an unauthorized work is discovered, the original content owner can recover the payload from the unauthorized copy and identify the recipient responsible for the unauthorized use.

Those of ordinary skill in the art will recognize that there are many other applications of robust digital watermarking.

Watermarking can be performed in the "baseband" or on compressed works. Baseband imagery or motion image sequences are, for example, pixel-domain representations. Baseband audio works are, for example, audio samples. Some applications require watermarking of a compressed work. In this case, the output is also a compressed work. The last step of compression is typically entropy coding and the first step of decompression is typically entropy decoding. The entropy encoding/decoding process is typically lossless, but the compression process typically also includes a lossy process. One approach for watermarking a compressed work is first to apply the entropy decoding, then apply the decompression to obtain a baseband representation. The baseband representation is watermarked and the resulting watermarked work is compressed and entropy coded. This approach can be time consuming and can result in degradation of perceptual quality due to the recompression.

To improve the perceptual quality and to reduce the computation required, information from the original compressed work, such as motion vectors, mode decisions, quality factors, and other information, can be saved during decompression and used during recompression. This means that the recompression need not perform any motion estimation (thus saving computation and/or time) and use of the original quantization factors and mode decisions can result in improved perceptual quality.

A class of watermarking algorithms called "compressed domain watermarking" has emerged. These methods can be described as performing a "partial decode" prior to watermarking rather than the "full decode" previously described. Here the compressed work is first entropy decoded to expose the syntax elements of the compressed work. These can include coefficients (block DCT (discrete cosine transform) or wavelet coefficients for example), motion vectors, picture types, prediction modes, and many other syntax elements.

The watermarking algorithm then directly modifies some of those syntax elements. Finally, the modified syntax elements are entropy coded to obtain the modified compressed work.

At least one implementation described in this application falls into a new class of watermarking algorithms which could be called "entropy coded stream watermarking." These methods directly modify an entropy coded stream as illustrated in FIG. 1.

Referring to FIG. 1, a system 100 performs watermarking. The system 100 may also be considered as a process. The original compressed stream is directly modified by stream modification 102, according to the Payload, and the output is the resulting marked compressed stream 103. The payload can be, for example, the serial number of a content (for example, DVD) player, the model of the player, or other information desired to be used for later identification. The payload can be uncoded, or can be coded as shown in data coding unit 120. The stream modification process is informed as to (1) the location of all changes to be made and (2) the actual changes to be made. The stream modification process is informed of this information by metadata which can be generated during a preprocessing stage 104.

The metadata 105 is generated by entropy decoding 106 (and possible further decoding if multiple layers of coding are used) the original compressed stream, and generating a watermark 108. The metadata identifies the locations within the stream where changes are to be made (that is, for watermark generation) and indicates how the stream should change in response to different payload symbols. Implementations of FIG. 1 are described for which the metadata is generated by an analysis of the decoded syntax elements of the compressed work. One challenging aspect of a watermarking method such as this is the generation of the metadata. The following explains how this can be done for one or more implementations.

The previous paragraph and FIG. 1 suggest that there may be a pre-processing stage 104. It is useful to point out the situation in which there are three important times. The first time is where/when the compressed bitstream is analyzed to generate some metadata. The second time is where/when some or all of the metadata generated at the first time is used, along with a specific sequence of symbols, known as the payload, to modify the bitstream. The third time is where/when some (or all or none) of the metadata generated at the first time is used to analyze a modified bitstream, a motion image sequence obtained by decompressing the modified bitstream, or a distorted version of the motion image sequence obtained by decompressing the modified bitstream. The purpose of this analysis, in the third time, is to recover the payload.

In order to understand the context, consider the first time occurring prior to distribution of a work, the second time occurring during duplication where the payload used for each copy uniquely identifies that copy, and the third time occurring after an unauthorized copy of the work has been found at which time the payload is recovered to reveal which of the distributed copies was the source of the unauthorized copy. This example is just an illustration, and is not intended to suggest any limits to the application of these concepts. In addition, while there may be application-specific requirements, there is no technical requirement that the first time (the preprocessing) and the second time (the embedding) be different. Indeed, all three "times" may be the same.

As additional examples, we refer back to FIG. 1. The pre-processing stage may be performed during the authoring of a movie for eventual delivery, for example. In one scenario, a process is performed to identify locations of coded elements for which acceptable replacement values have been determined. The results of that process (for example, the locations of such coded elements and the acceptable replacement values) are stored in metadata that is included with the coded movie. For this example, consider two cases. In one case, each entry of the metadata identifies a location in the bitstream and one acceptable replacement value. In a second case, two acceptable replacement values are identified in each metadata entry.

The stream modification may be performed during playback of the movie, in which, for example, the serial number of the player (for example, a software player, a set top box player, or a DVD player) is used as the payload. The payload is used, for example, to determine whether to replace the identified coded elements. For example, if a single acceptable alternative is provided in the metadata, then a "1" in the payload sequence may indicate that the original value be replaced with the alternative value, and a "0" may indicate that the original value be retained. As another example, all identified locations may be replaced, and the payload may indicate which of two provided replacement values (for each location in the coded sequence) is to be used. For example, a "0" may indicate use of the first replacement, and a "1" may indicate use of the second replacement. Note that the words "alternative" and "replacement" are often used interchangeably in this application. Further, the alternative (or replacement) may refer to a variety of items, depending on context. The alternative may be, for example, an alternative value for a syntax element or an alternative value for coded bits representing a value of a syntax element.

The recovery of the payload may be performed at a geographic location that is unrelated to the geographic locations at which the stream modification occurred. In other words, the stream modification may take place in Toledo, Ohio and the payload recovery may take place in Burbank, Calif. The key is to have access to a document containing data based on a modified stream. For example, a modified stream may be copied electronically and put on a recordable DVD, or a modified stream may be presented and then re-recorded and encoded, and then put on a recordable DVD. If this recordable DVD is acquired, then this recordable DVD can be analyzed to recover the payload. Recovery of the payload may be assisted with detection metadata (shown in FIG. 1). Detection metadata may indicate, for example, the locations in the data stream where watermarking information is embedded, as well as the acceptable replacement values. Detection metadata may also, or alternatively, indicate, for example, a location within a picture (for example, frame or field) in which the watermark information is intended to produce a detectable change in the pixel-domain data. In this latter scenario, the detection metadata may also indicate the expected change(s), as explained further below. Detection metadata may be produced at the same time that the watermarking (embedding) metadata is produced, or at a different stage.

A "watermark" may refer, for example, to the embedded data that replaces the original data in a data stream. A "watermark" may also, or alternatively, refer to the effect that is produced on a decoded, displayed video picture in the baseband imagery as a result of embedding replacement data in the data stream. Thus, the "watermark" may refer to one or more of the embedded data or the produced effect on the resulting baseband data (for example, an image or an audio clip). For example, the produced effect may be a change in the luminance of a macroblock that is detectable but not perceptible to a viewer.

We now provide a discussion of CAVLC-based data embedding in an AVC-coded bitstream. One way to watermark a compressed stream is to change the values of one or more syntax elements. A general requirement is that the changed compressed stream is still a valid stream (remains compliant with the specific compression standard). This requirement is to be met when the compression technique uses a variable-length code entropy coding technique. This is the case for AVC with CAVLC. The changed (that is, modified) syntax element will be encoded using CAVLC, and these modified CAVLC bits will replace the CAVLC-encoded original values in the bit stream. These bits may be the same length (same number of bits) as the CAVLC encoding of the unmodified syntax element, or may have a different length. However, whether the length is the same or not, there is no effect on the accuracy of the other CAVLC bits because the CAVLC encoding of a syntax element does not depend on prior or subsequent syntax element encodings.

Figures 2A, 2B:
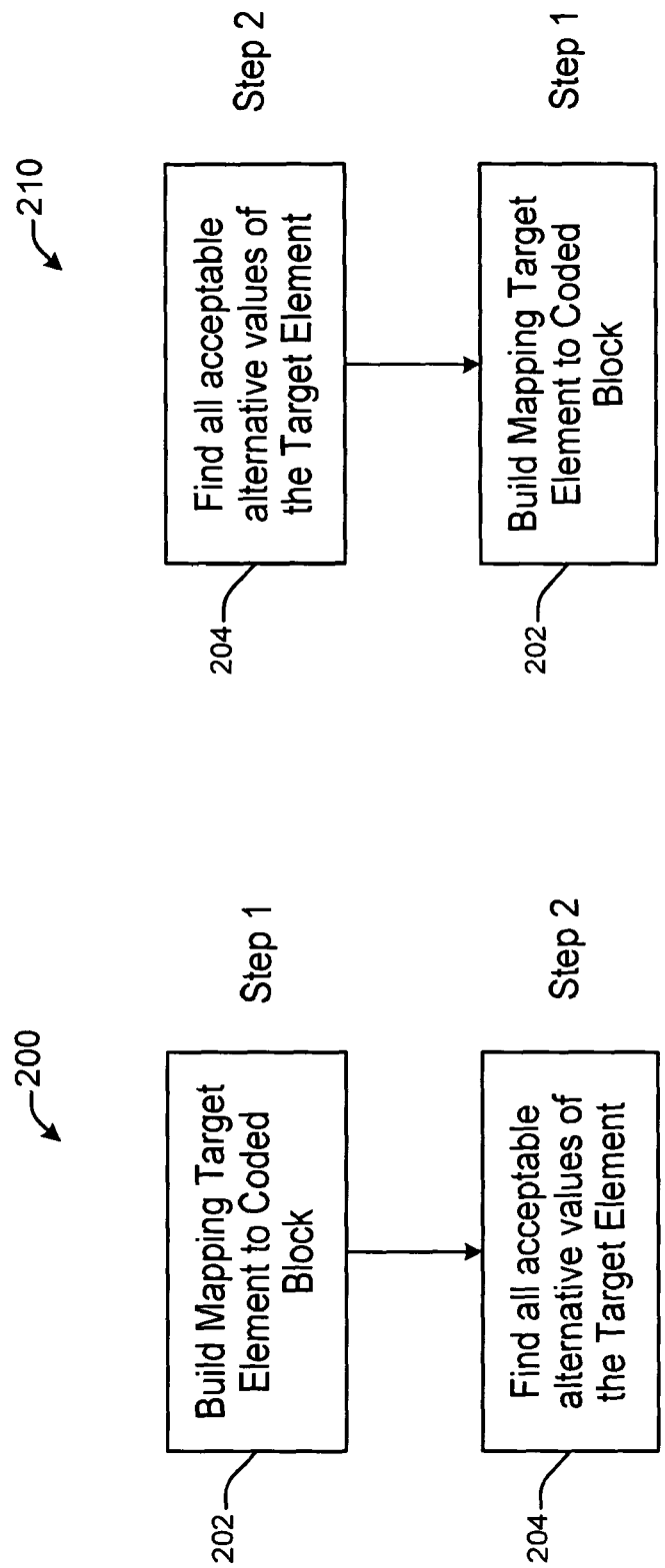
FIG. 2a is a block diagram showing an ordering of operations used in modifying an encoded bitstream.
FIG. 2b is a block diagram showing another ordering of operations used in modifying an encoded bitstream.

In various described implementations, there are two general steps to modifying a CAVLC encoded bitstream, but the steps can be performed in either order. In discussing these steps, reference is made to "Step 1" and "Step 2", but these step numbers are not intended to imply or require any particular or specific order of performance of the same. FIGS. 2a and 2b include block diagrams 200 and 210 that each show these two general steps.

Given a CAVLC encoded AVC bitstream, Step 1 is to build a mapping (202) from the target element to the original coded block. In one practical implementation, this is done by decoding the bitstream and keeping track of which bitstream bits produce which syntax elements. For example, a CAVLC decoder may be applied to the compressed bitstream to expose the syntax elements.

Step 2 is to search for one or more acceptable alternative values for the target element (204). One way to search for acceptable alternative values is to examine all possible alternative values and determine which, if any, are acceptable. Each possible alternative syntax value is CAVLC coded to yield the alternative bits. In general, all possible alternative syntax values are "acceptable alternative values". However, various implementations have one or more additional criteria.

One criterion is CAVLC encoding length. Because CAVLC is a variable-length code, some alternative syntax values will change the length of the CAVLC encoding. This is acceptable in some implementations, but other implementations impose a requirement that the CAVLC encoding length remain the same before and after watermarking. Other criteria relate, for example, to fidelity and detectability, as discussed further below.

Two different orderings of these two steps 202, 204 are depicted in FIGS. 2a and 2b, respectively. Note that in FIG. 2b the mapping and assignment in Step 1 (202) is only required for target elements for which at least one alternative syntax value was found in Step 2 (204).

The AVC video compression standard, like most video compression standards, achieves compression by predicting the values in a block of pixels from the values in one or more previously coded blocks of pixels. The difference between the prediction and the actual values, often called the residue, is then transform coded and quantized. The block or blocks used for the prediction, the reference blocks, can be from the same picture or from different pictures. Blocks whose reference blocks come from the same picture are called Intracoded blocks or simply Intra-blocks. In this case, the prediction is often called Intra-prediction.

For the luminance samples, an entire 16×16 macroblock can be Intra-predicted as a whole or can be divided into 8×8 sub-blocks or even 4×4 sub-blocks. Each sub-block will then be Intra-predicted independently. For 16×16 luminance Intra-prediction, four modes are defined in the standard. For 8×8 and 4×4 sub-blocks, nine modes are defined for each type of block. The encoder typically selects the prediction mode for each block that minimizes the difference between a predicted block and the actual pixel values.

Figure 3:
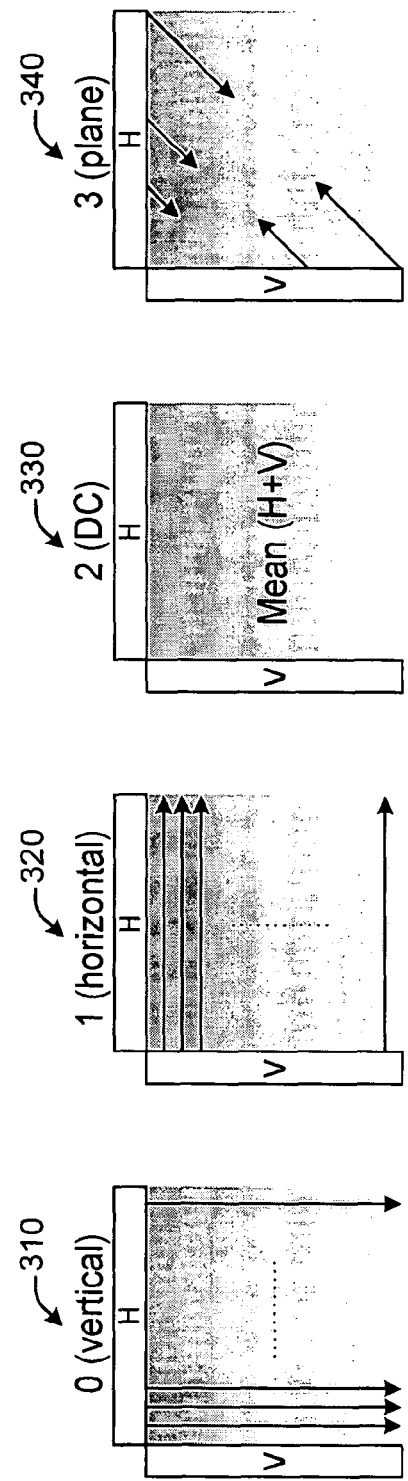
FIG. 3 illustrates four prediction modes.

To simplify the discussion, we only discuss 16×16 Intra-prediction. For 16×16 Intra-prediction, the following four modes are defined as illustrated in FIG. 3:

1. Mode 0 (vertical) 310—Extrapolation from upper samples (H). In this mode, the neighboring pixels bordering the upper edge of a block are used as a prediction for all pixels in the corresponding columns of the block. That is, for a given column in the 16×16 block, the bordering pixel in the upper vertically-adjacent block is used as the prediction for the entire column.

2. Mode 1 (horizontal) 320—Extrapolation from left samples (V). In this mode, the neighboring pixels bordering the left edge of a block are used as a prediction for all pixels in the corresponding rows of the block. That is, for a given row in the 16×16 block, the bordering pixel in the left horizontally-adjacent block is used as the prediction for the entire row.

3. Mode 2 (DC) 330—Mean of upper and left-hand samples (H+V). In this mode, the neighboring pixels bordering the upper edge of a block, and the neighboring pixels bordering the left edge of the block, are averaged to determine the mean. The mean value is then used as a prediction for all of the pixels of the block. That is, the mean is determined of all of the bordering pixels in the left horizontally-adjacent block and in the upper vertically-adjacent block. The mean of these pixels is then used as the prediction for all of the pixels of the block. Each pixel in the block will then have the same prediction.

4. Mode 3 (Plane) 340—A linear plane is fitted to the upper and left-hand samples H and V. In this mode, a plane is formed. The plane is based on all of the bordering pixels in the left horizontally-adjacent block and all of the bordering pixels in the upper vertically-adjacent block. The plane provides the prediction for each pixel in the block.

Note that the modes for 8×8 and 4×4 Intra-prediction can be modified in a manner that is analogous to the modification described herein of the 16×16 Intra prediction modes. Further, all 3 block sizes use additional syntax that is amenable to modification in an analogous manner to the modification of the mode.

To decode a block, the predicted block is generated with the available pixels of previously decoded neighboring blocks as specified by the Intra-prediction mode of the current block. Then, the decoded residue pixel values are added to the predicted block. The result is the final decoded pixel block.

$$B = P + R \qquad (3\text{-}1)$$

where B is the final decoded block of pixel values, P is the predicted block, and R is the block of decoded residues.

The basic idea of using Intra-prediction for watermarking in this implementation is to change the Intra-prediction mode from one to another while not modifying the residue data. That is, the residue, R, is left unchanged although it may no longer be an accurate residue for the new predicted block. The result of changing the prediction mode will be a different predicted block (referred to as $P_W$). As a result, the final decoded pixel block (now referred to as $B_W$) will be different from it should have been (which is B). That is, $B_W = P_W + R$, and $B_W$ does not equal B.

The difference between the original block of decoded pixel values (B) and the watermarked block of pixel values ($B_W$), denoted $\Delta B$, will be the same as the difference between the original predicted block of pixels (P) and the watermarked predicted block of pixel values ($P_W$), denoted $\Delta P$.

$$\Delta B = \Delta P \text{ where } \Delta B = B_w - B \text{ and } \Delta P = P_w - P, \quad (3\text{-}2)$$

and the subscript 'w' indicates the watermarked version of each.

By changing the Intra-prediction mode of a macroblock, the pixels of that block will change by $\Delta B$. For this change to be appropriate for watermarking, we require in at least this implementation that the following three requirements (R1-R3) be satisfied:

R1: the change be detectable from the reconstructed imagery,

R2: the change be imperceptible in the reconstructed imagery, and

R3: the detection be robust to some predefined set of signal distortions.

To this end, we evaluate the suitability of each possible change and select only those changes that meet these requirements.

The second requirement can be interpreted in many ways. We can require that the reconstructed imagery have high visual quality or that it be indistinguishable from the original, unmarked imagery, or that the perceptibility of the changes fall below some threshold which may be application dependent. There are many ways people judge the fidelity of a watermark. For the purposes of this disclosure, we allow any appropriate fidelity measure to be applied to judge whether or not, or to what extent, a proposed change meets the fidelity requirements of the application.

Assessing the fidelity requirement (R2) may be done in various ways. For a given target element, we need to assess or predict the perceptual impact of replacing its original value with each of the alternative values. Recall that this assessment or prediction has full access to all of the syntax elements of the compressed stream and can use these to predict the masking effect of the underlying imagery and the sensitivity of the human visual or auditory system (in the case of video, we are concerned with the human visual system) to the modifications. Details of such a prediction are well known to those versed in the art of perceptual modeling. Perceptual models are widely cited in both the compression literature and the watermarking literature.

In addition to the use of compressed domain computational predictions of perceptibility, we may have the luxury of being able to fully decompress the stream to a baseband motion image sequence. This may be the case, for example, if the analysis is being performed as a pre-process. In this case, the computational predictions can examine the actual pixel data. This may lead to more accurate predictions of perceptibility. Additionally, we may be able to assess the perceptibility of replacing an original syntax element value with an alternative value by decompressing the original stream to obtain a reference motion image sequence and then replacing the syntax element value with the alternative and decompressing the resulting stream to obtain a second motion image sequence. Many well known techniques can be used for assessing the perceptibility of the difference between the two motion image sequences.

Finally, we may have the luxury to resort to subjective assessment. A human viewer can assess the perceptibility of the difference between the reference motion image sequence and the modified motion image sequence. Human subjects can assess the degree to which a modification satisfies Requirement R2 for a given application.

These are but some of the methods that can be used to determine which of the possible syntax element changes satisfy Requirement R2.

We now consider the first Requirement R1 from a general standpoint. Use of the alternative syntax value for the target syntax element is assumed to induce some measurable change when the modified stream is later decompressed to a motion image sequence. There are generally two kinds of measurable changes that can be induced, "direct" and "indirect".

With "direct changes" the syntax element corresponds directly to a measurable artifact of the motion image sequence. For example, modification of a luminance block DC coefficient will directly result in a measurable change in mean luminance of the corresponding decompressed block. With "indirect changes" on the other hand the artifact measured in the image sequence is only indirectly related to the modification in the stream. For example, modification of a motion vector will result in the wrong block being used as a prediction and will therefore lead to incorrect pixel data in the corresponding decompressed block. It may be difficult to determine which motion vector was used, but the use of a different motion vector can impact other measurable artifacts. The motion vector can be used to yield a reconstructed block with higher or lower mean luminance.

The measurable change of requirement R1 may assist in identifying the locations and in seeing what changes were made in order to recover the payload. This is particularly useful when a pirated copy is obtained. By "seeing" the changes that were made, the source of the pirated copy can be obtained.

In one implementation, it is determined which motion vector syntax elements have at least two alternative syntax values, such that use of one of the alternative syntax values will yield a reconstructed block with higher mean luminance and use of a different alternative syntax value will yield a reconstructed block with lower mean luminance. The coded blocks of bits corresponding to the CAVLC coding of each of these two alternative values, along with the bit location within the CAVLC stream, are sent, as metadata, to the embedder. Based on the value of the corresponding payload bit, the embedder will replace the original block of bits with the block of bits corresponding to one or the other alternative block of bits.

For example, the embedder chooses or selects the block of bits associated with the syntax value that decreases the mean luminance in the corresponding block if the payload bit is a '0' and chooses the block of bits associated with the syntax value that increases the mean luminance in the corresponding block if the payload bit is a '1'. Clearly, we need at least one target element satisfying all of the requirements for each payload bit that is to be embedded.

The metadata may also contain the frame number and block number in the decompressed motion image sequence where the change in luminance will be induced. For further robustness, the preprocessing stage may also store the original mean luminance of that block in the metadata. This information may be used at the time of recovery (for example, decoding) to identify the modified block and compare its mean luminance with the original value stored in the metadata. In the example given, a mean luminance that is higher than the original value will imply that the corresponding payload bit is a '1' and a mean luminance that is lower than the original value will imply that the corresponding payload bit is a '0'.

For this implementation, the first and third requirements (that the change be robustly detectable) require establishing a good feature that can be reliably measured in the decoded imagery and can be modified by changing the Intra-prediction mode of a macroblock. One such feature is the mean luminance of the macroblock. Each Intra-prediction mode change will result in a change, ΔB, in the decoded pixel values. Note that ΔB is, in general, a matrix of values (that is, ΔB is also a block). This ΔB may have a positive or negative average value (averaged over the block) and the magnitude of the average can vary from one mode to another. The sign of the change (for example, the average value for ΔB) can be used to encode (embed) data. Further, the magnitude of the change can be used as an indication of the expected robustness of the change, with a large magnitude indicating more robustness against further modifications to the coded bitstream. More sophisticated measures of robustness are available and can be used.

A second feature that may be used to satisfy R1 and R3 is the variance of the reconstructed block of pixels. DC mode (mode 2) is different from the other three Intra-prediction modes in that all the 16×16 pixel values are predicted with a single value, which is the mean of the reference pixels. It is expected that an AVC encoder will use this mode when a block is smooth in nature.

If we change the mode from mode 2 to one of the remaining three modes, the variance of the resultant block ($B_W$) can be expected to increase with respect to the original block "B". On the other hand, if an encoder chose modes 0, 1, or 3, it is expected that this block has higher fluctuation to begin with (compared to the situation in which mode 2 was initially chosen). By changing the intra-prediction mode from modes 0, 1, or 3 to mode 2, the variance of this block $B_W$ will generally decrease with respect to the variance of "B". Again, the ΔB associated with a change of Intra-prediction mode may result in an increase or decrease in the variance of the reconstructed block $B_W$, and the magnitude of the variance change can vary depending on the beginning and ending modes. The sign of the variance change can be used to encode (embed) data. Further, the magnitude of the variance change can be used as an indication of the expected robustness of the change, with a large magnitude indicating more robustness against further modifications to the coded bitstream. More sophisticated measures of robustness are available and can be used.

We now discuss an implementation for changing intra-prediction mode through the macroblock type. In AVC, the 16×16 Intra-prediction mode of a macro-block is specified in the mb-type field. The mb-type field also specifies other parameters about this block such as coded-block-pattern.

Referring to FIG. 4, a table 400 lists the macroblock types ("mb-types") for I slices and provides a list of mb-type values 410 with their meanings. This table 400, taken directly from the standard, is used in this implementation to find mb-type values 410 that change the Intra-prediction mode 420 without changing the coded-block-patterns 430 and 440 or the prediction block size 445.

In order to preserve syntax other than Intra-prediction mode 420 when changing the Intra-prediction mode 420, the change of the mb-type 410 is limited to the values that differ only in Intra-prediction mode 420. For example, an original mb-type of 11 (see row 450), indicates that the Intra-prediction mode 420 is 2 (DC) and that the coded-block-pattern for chroma 430 and luma 440 are 2 and 0 respectively. This mb-type 410 can be changed to 9, 10, or 12 to change the Intra-prediction mode 420 without changing the coded-block-patterns 430 and 440 or the prediction block size 445.

The mb-type is entropy coded in the bitstream. If CAVLC entropy coding is used, the mb-type is encoded with exp-Golomb code. Exp-Golomb code is a variable length coding scheme. Some special applications, such as the watermarking of authored DVD disks, require that the replacement (e.g. VLC) data have exactly the same length as the original (e.g. VLC) data. In this case, only mb-types that result in same number of (e.g. VLC) bits can be used to replace the original mb-type.

Figures 5, 6:
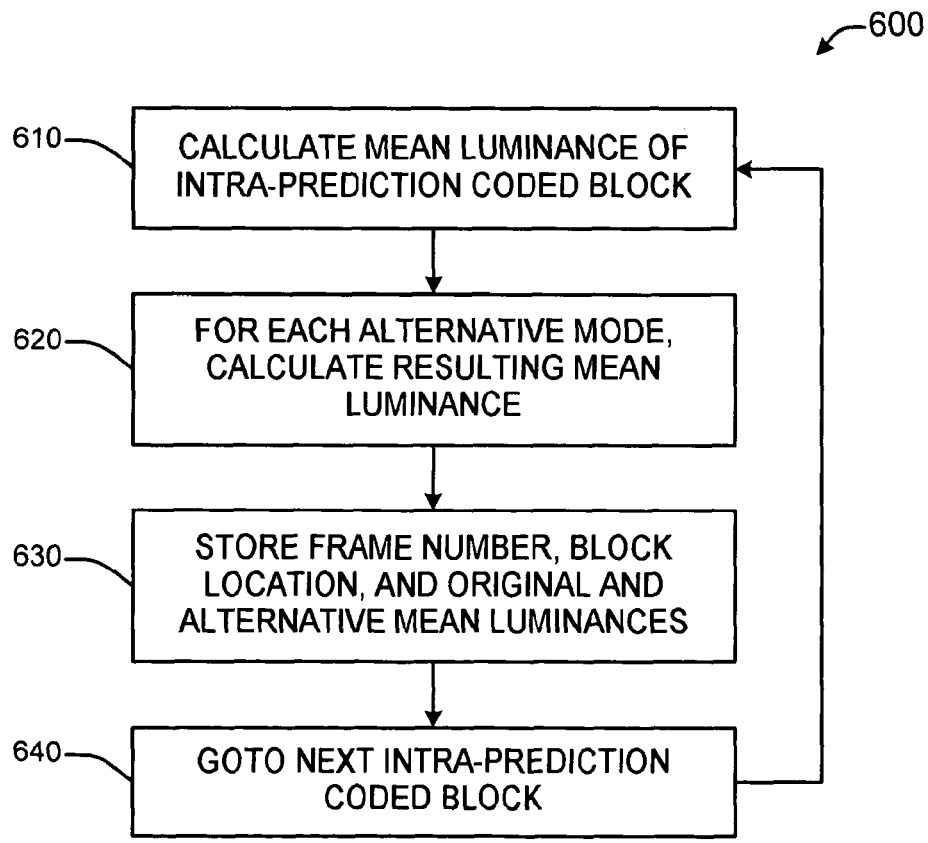
FIG. 5 is a table showing an exp-Golomb coding provided in one particular standard.
FIG. 6 is a flow diagram of an implementation for determining detection values for alternative intra-prediction modes.

Referring to FIG. 5, a table 500 is an Exp-Golomb coding table, and lists the bit string form (left-hand column) 510 and the corresponding value range of the Exp-Golomb code (right-hand column) 520. Table 500 is taken directly from the standard. From this table 500, we find that, using the example from above, an mb-type of 9 requires 7 bits. This can be determined by first noting that the mb-type of 9 occurs in the range 520 given in the fourth entry 530 of the right-hand column 520 which has the value "7-14". Then we note that the corresponding (fourth) entry 530 of the left-hand column 510 shows 7 bits, which are 0 0 0 1 $x_2$ $x_1$ $x_0$. $X_2$ $x_1$ $x_0$ may be assigned, for example, in order, with 000 being assigned to the value 7 and 111 being assigned to the value 14.

Accordingly, in this implementation in which the length of the CAVLC string is to remain the same before and after watermarking, the mb-type can only be replaced with another mb-type also requiring 7 bits. In this case, mb-types 9, 10, and 12 all fall in the same range (7-14) and all require 7 bits. Thus, mb-types 9, 10, and 12 are all possible candidate replacement mb-types. In this way, we can combine the VLC bit lengths of FIG. 5 with the macroblock types of FIG. 4 to determine which mb-types can be used to replace the original mb-type. The following rules are enforced in the above methodology:

1. The alternative mb-type should differ only in Intra-prediction mode.

2. The size of the bit string corresponding to the alternative mb-type should be the same as that corresponding to the original mb-type (if constant bit length is required).

In a previous section, we suggested that a potential change should be evaluated with respect to its impact on the fidelity of the reconstructed imagery and the robustness of its detectability. In this section, we describe a method for combining those two effects into a single cost value and the use of that cost value in selecting which changes to apply.

Referring again to FIG. 1, the input of the preprocessing is the AVC encoded bitstream. The output is the watermarking metadata. One of the first steps in processing the stream is to identify each intra-coded block, the Intra-prediction mode of which can potentially be changed. For each of these intra-coded blocks, we identify all alternative Intra-prediction modes that satisfy the bit-length requirement (if the application requires constant bit length), and that satisfy the first rule above that the corresponding alternative mb-types differ only in Intra-prediction mode. Assuming a particular detection measure (such as, for example, the luminance mean, or variance of a block as previously discussed), an additional step is to gather the original detection value and all the alternative detection values. A "detection value" is a value (a number) of the detection measure that results from the encoding. For example, the value of the luminance mean for a block. An alternative detection value is the value that would result from using each of the alternative Intra-prediction modes.

Referring to FIG. 6, a process 600 illustrates an embodiment for determining detection values when mean luminance is used as a detection measure. One or more detection values may be determined for a given block. For example, if there are multiple alternatives for a given block, a detection value may be determined for each alternative. Typical implementations optimize among the determined detection values. Such optimization may include, for example, selecting the best alternative for each block, and then selecting the top ten from among these best alternatives. This example results in picking the ten blocks with the best detection values, where "best" is determined according to a selected measure, for example. Another implementation considers, for a given block, pairs of alternatives, and selects the best pair for each block, as is explained further below.

The process 600 includes calculating the mean luminance of an intra-prediction coded block 610. This is the original detection value, and the mean luminance may be calculated from the sum of the prediction and the decoded residue as discussed earlier with respect to Equation 3-1.

The process 600 then includes calculating the mean luminance of the intra-prediction coded block for each alternative intra-prediction mode 620. Operation 620 uses the alternative mode for the prediction. The mean luminance may be calculated using, for example, the prediction with or without the existing residue data.

The process 600 stores the frame number (or, more generally, the picture number), the block location, and all of the mean luminances 630. These mean luminances include the mean luminance resulting from the original intra-prediction mode (operation 610) and the mean luminance(s) resulting from the alternative intra-prediction mode(s) (operation 620).

The process 600 proceeds to the next intra-prediction coded block 640 and repeats the operations 610-630. The process 600 is performed for all intra-prediction coded blocks in a given picture. Other implementations, of course, need not be as exhaustive. Note that an intra-prediction coded block may be, for example, a block from an intra-coded picture (for example, an I frame), or a block from an inter-coded picture (for example, a P frame) if that block is intra-coded.

Using the information gathered in the process 600, an implementation may make a determination directly as to which locations and which alternative replacement values should be used to provide watermarking. Various decision processes may be used. Below we discuss an implementation of one such process. The implementation discussed below uses, for example, the information gathered in the process 600 to select locations and alternative values that meet, for example, the requirements R1, R2, and R3 listed earlier.

The key properties to a watermarking algorithm are typically the robustness (R3, above) and the fidelity (R2, above). Fidelity is also referred to as the imperceptibility. Often, these two properties of robustness and fidelity contradict each other. We introduce an analytical method to specify a balance between these two.

Let $C_F$ represent the fidelity cost. $C_F$ is defined such that the more visible the watermark, the larger the value. We would like to make changes that have very low fidelity cost. There are many methods for measuring $C_F$, and a user may select the method/measure best suited to a particular application—the present implementation is independent of the selection.

Let $C_R$ represent the robustness cost. $C_R$ is defined such that changes resulting in weaker robustness have a higher robustness cost. Weaker robustness means, for example, that the changes can become undetectable more easily. For example, if a picture is decoded and the pixel data is filtered, some changes may become weakened and possibly become undetectable. Again, we seek to make changes that have a lower robustness cost.

For each alternative change, we calculate both the fidelity cost and robustness cost associated with making the change. We then combine these two costs to obtain a total cost for making the change. That total cost is calculated as follows:

$$C=\alpha C_F+\beta C_R$$

where it is often helpful for restricting $\alpha+\beta=1$. In this case we can write $$C=\alpha C_F+(1-\alpha)C_R.$$

The parameter $\alpha$, restricted to the range of 0 to 1, is used to control the tradeoff between fidelity and robustness. A larger value of $\alpha$ places more emphasis on fidelity while a lower value of $\alpha$ places more emphasis on robustness. For a given $\alpha$, the cost C for each alternative prediction mode can be calculated. Those for which C exceeds a threshold can be discarded.

To satisfy R2 above, which is the imperceptibility requirement, an implementation may additionally use, for example, a threshold level for $C_F$. For example, in one implementation, the value of $C_F$ for an alternative prediction mode is compared to a threshold. If the value of $C_F$ is greater than the threshold, then the alternative prediction mode will not be accepted as a possible replacement for the original prediction mode.

In one particular implementation that uses the above formulation of costs, 16×16 macro-blocks are used. In a 16×16 Intra-predicted macro-block, there are three available alternative Intra-prediction modes and the original mode. For this example, we assume that all of the different Intra-prediction mode values are valid alternatives in that we can change the mode to any one without changing the coded-block-patterns or the coded bit length (if constant bit length is required). A review of FIGS. 4-5 will reveal that this assumption is not always met, but the assumption is useful for clarity and simplicity of the current discussion. In addition, we will assume that the detection measure is the mean luminance of the block.

To embed a data bit, two prediction modes can be selected: a first mode will be used to represent a '1' and a second mode will be used to represent a '0'. We assume a prediction mode resulting in a lower mean luminance will be used to represent bit '0' and a prediction mode resulting in a larger mean luminance will be used to represent bit '1'. Then, there are six possible pair combinations: $\{P_1=(\text{mode0}, \text{mode1}), P_2=(\text{mode0}, \text{mode2}), P_3=(\text{mode0}, \text{mode3}), P_4=(\text{mode1}, \text{mode2}), P_5=(\text{mode1}, \text{mode3}), P_6=(\text{mode2}, \text{mode3})\}$. (Note that some of these combinations will be unavailable if some of the prediction modes are not valid alternatives.) In this case, we need to calculate the fidelity and robustness costs, $C_F$ and $C_R$, associated with selection of each pair combination. Those costs can then be used to compare each to the application requirements. For each pair combination, the $C_F$ and $C_R$ are evaluated as follows.

Let B denote the original block of pixels. Let $\Delta B_0$ and $\Delta B_1$ denote the pixel differences between the watermarked block and the original block if bit '0' or bit '1' is embedded, respectively. If the original Intra-prediction mode is used to represent a '0' or a '1' bit, the corresponding $\Delta B$ is simply all zeros. In such a case, the fidelity cost depends only on the other mode that is selected. Assuming that there are K available pairs, the fidelity cost of pair k can be obtained by:

$$C_{Fpk}=F(B,\Delta B_0,\Delta B_1) \quad (4\text{-}1)$$

where the function F(•) incorporates any fidelity measure as discussed above (for example, the Watson model) and k is an index running from 1 to K. Typically, this fidelity function will evaluate $\Delta B_0$ and $\Delta B_1$ independently, obtaining a fidelity cost value for each, and will return the larger of the two values, representing the "worse" fidelity of the two or the sum of the two values. The fidelity measure may also be, in part or whole, a subjective measure based on user evaluation.

Let $L_0$ and $L_1$ denote the luminance (a single value in this implementation) of the block if bit '0' or bit '1' is embedded, respectively. Let BlkSz denote the Intra-prediction block size.

The robustness cost can be measured as a function of $L_0$, $L_1$, and BlkSz. For a given luminance (or luminance change), a larger blocksize may provide for increased robustness. The robustness cost of pair k can be obtained by:

$$C_{Rpk} = G(L_0, L_1, BlkSz) \quad (4\text{-}2)$$

where the function $G(\cdot)$ is any robustness measure as discussed above (for example, the magnitude of the variance change or the mean luminance change). Again, a typical robustness measure will evaluate the robustness of each change independently and return the larger of the two costs or the sum of the two costs.

Finally, the final watermarking cost of this pair is:

$$C_k = \alpha C_{Fpk} + \beta C_{RPk} \quad (4\text{-}3)$$

Once the cost associated with each pair has been calculated, the pair with minimum cost can be selected for that block and the corresponding cost can be assigned to C, the cost of changing the block.

$$C = \min(C_k) \text{ where } k = 1 \ldots K \quad (4\text{-}4)$$

Once the watermarking cost of each block has been established, the block selection process can be simply picking blocks having the smallest watermarking costs based on the payload requirement. For example, if there are 10 payload bits, then the 10 blocks with the smallest watermarking cost can be selected. The 10 payload bits of this example may be generated, for example, by encoding one or more payload symbols to increase robustness. Another implementation does not encode payload symbols/information to increase robustness, but merely represents the payload information in binary form as payload bits.

Referring again to the implementation of FIG. 1, the watermarking embedding metadata 105 contains the bit offsets identifying the location where, in the bitstream, each modification will take place and the values to be used in the case that the payload bit is a '0' or a '1'. Thus, when keeping track of an alternative change, we track the bit location in the input AVC stream where the VLC code describing the current mb-type can be found. We also keep track of the specific bit string (from the table of FIG. 5) that is used to represent each alternative change. Thus, after selection (perhaps based on minimizing the total cost), the system can write out the embedding metadata 105. For each entry in this file, there is a bit offset and two bit strings (for example, the VLC bit strings), one for each of the two possible payload bits, '0' and '1'.

In addition, the preprocessing stage writes detection metadata (also shown in FIG. 1). This includes the frame number (or, more generally, picture number) and block location of each change as well as the expected luminances (or other detection measure) of the watermarked block if it represents bit '0' and '1'. Also note that implementations may include the embedding metadata in the detection metadata to allow for detecting the presence of watermarking information in a stream prior to decoding.

As just suggested, detection may be performed at the bitstream level, in lieu of or in addition to performing detection at the pixel level. By analyzing a bitstream, it can be determined what payload bits are embedded at the designated bit offsets. However, as discussed earlier, if the bitstream has been processed by, for example, decoding and then re-encoding, the resulting (encoded) bitstream may be completely different from the original (encoded) bitstream. For example, the re-encoding may use (as indicated earlier) different block sizes or modes. In such a case, detection of the watermark from the bitstream may be impossible, but detection of the watermark from the pixels (after decoding the new bitstream) is possible if the watermark was robust enough.

Figure 7:
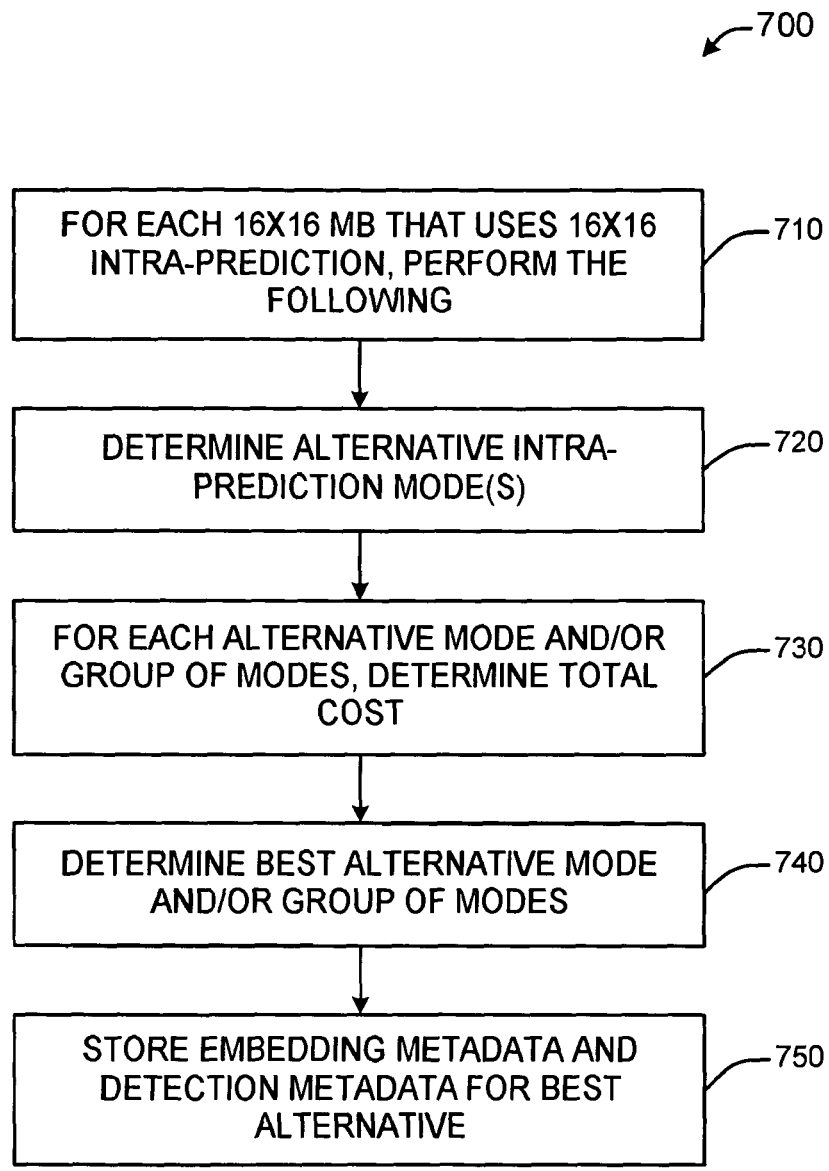
FIG. 7 is a flow diagram of an implementation for determining watermarking metadata.

Referring to FIG. 7, a process 700 provides an implementation that determines the watermarking metadata (embedding and detection) for 16×16 intra-prediction coded macroblocks using a cost approach. The process 700 includes the basic features of the process 600. That is, the process 700 of determining watermarking metadata for macroblocks includes determining detection values for those macroblocks.

The process 700 may be performed, for example, for a given set of macroblocks in a picture, or for all macroblocks in a picture, or for all macroblocks in a sequence of pictures. In the following discussion of the process 700, an implementation is assumed in which the process 700 is performed for all macroblocks in a picture.

The process 700 includes looping (710) over all 16×16 macroblocks in the picture, and performing a set of operations (720-750) for each 16×16 macroblock that uses a 16×16 intra-prediction mode (see, for example, FIG. 4). The set of operations includes operations 720-750.

For each macroblock using a 16×16 intra-prediction mode, the possible alternative intra-prediction modes, if any, are determined (720). In one implementation, the alternatives must satisfy the requirements that the coded-block patterns (430 and 440) and the prediction block size (445) remain the same, and the coded bit length of the macroblock type (410) remains the same (see FIG. 5).

For each possible alternative intra-prediction mode or group of modes, the total cost is determined (730). In one implementation, determining the total cost involves calculating the fidelity cost and the robustness cost using the sequence of equations described above. A group of modes may be, for example, a pair of modes as discussed earlier, or some other combination of modes.

The best possible alternative intra-prediction mode, or group of modes, is determined (740). In one implementation, the best is determined using a minimization function such as in Equation 4-4 above, which selects the pair with the minimum total cost. Other implementations use different functions to determine the best possible alternative, and also may identify multiple "best" possible alternatives. For example, in an implementation discussed above, the "best" possible alternative is a pair. The pair may include one alternative, or two alternatives. In typical implementations of the process 700, if there are no possible alternative intra-prediction modes, then there is no "best" mode.

The embedding metadata and the detection metadata are stored for the best possible alternative intra-prediction mode or group of modes (750). In one implementation, the embedding metadata includes the bit offset into the stream and the coded alternative macroblock type(s), in which the alternative macroblock type(s) corresponds to the best possible alternative intra-prediction mode(s). In one implementation, the detection metadata includes the picture number (or frame number), the macroblock location, and the original and alternative detection values or some other reference detection value. In such an implementation, the detection values may be computed during the operation 730 of calculating the total cost. For example, the detection values may be determined in the process of calculating a robustness cost.

Various implementations reduce, or more generally filter, the metadata prior to, or subsequent to, storing the metadata. In one such implementation, the best alternative mode (or group of modes) for each block are rank ordered and only the top one-hundred are kept and stored because there are only one-hundred payload bits. A second implementation specifies a minimum number of unchanged bits that must be between any two changes in the bitstream. This criterion in the second implementation may, for example, preclude using the best alternative modes for two adjacent blocks. A third implementation specifies the size (in number of bits) of each particular change in the entropy-encoded bitstream. This criterion in the third implementation may, for example, dictate the size of the entries in the embedding metadata. Each particular change need not, of course, actually change the value of every bit that is replaced. In yet another implementation, for a given block, the metadata is only stored for the best alternative mode (or group of modes) if this best alternative also satisfies the requirements R1, R2, and R3. Further, implementations may combine these and other criteria.

In one implementation, embedding metadata includes the locations in the compressed bitstream where the original coded block of bits can be found and two blocks of bits, one to be used as a replacement block if the corresponding payload bit is a '0' and the other to be used as a replacement block if the corresponding payload bit is a '1'. In one implementation, one of these blocks is itself the original block of bits and the other is an alternative block of bits. In this case, the list of changeable syntax elements can include those for which there is only one acceptable alternative value. In another implementation, the two blocks are both alternative blocks of bits corresponding to different syntax values. In this case, the list of changeable syntax elements can only include those for which there are at least two acceptable alternatives.

In one implementation, detection metadata includes the embedding metadata. With such information, the payload can be recovered directly from a watermarked coded bitstream.

In one implementation, detection metadata additionally or alternatively includes the location in the decompressed motion image sequence where the bitstream modification will be detectable. This may be specified as a frame or picture number and a block number, macroblock number, pixel position, or any other locator required for recovery. The detection metadata also may include an indication of the detection value associated with a payload bit of "0" and a payload bit of "1" or some other reference detection value.

Detection metadata can also include the value of the detection measure that would have been measured if no change had been made. In other words, this can include the original value of the detection measure. In a previous example, the detection measure is the mean luminance of a particular block and the detection data can include the original mean luminance of that block. By including the original value, the detection process can ascertain whether the detection value has increased or decreased as a result of the watermarking. In one implementation, determining the metadata is performed during pre-processing.

Figure 8:
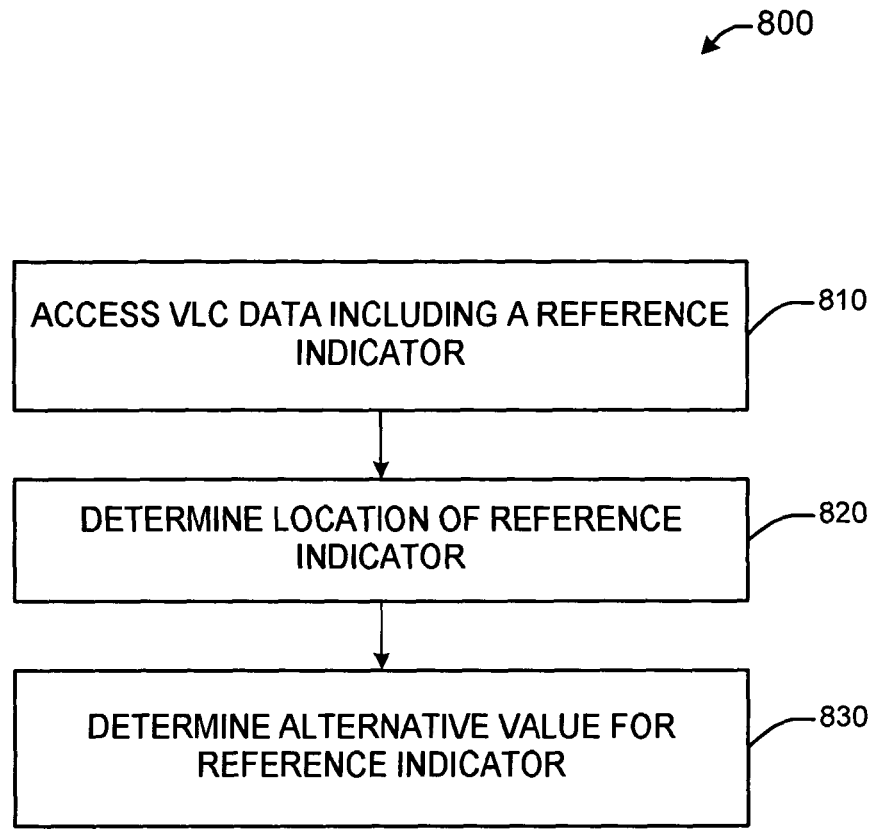
FIG. 8 is a flow diagram of an implementation for determining alternative values for a reference indicator.

In order to increase the robustness of the watermarking technique to global or local changes in brightness or contrast, detection data may also be saved for blocks that are not expected to be modified by the watermarking process. For example, the detection data may include the original mean luminance of blocks not changed by the watermark. The detector can then use these as a reference to determine if the entire image, or at least the part of the image in the region of the reference, has experienced a change in luminance. If the measured luminance in the reference blocks does not match that recorded in the detection data, a compensation can be made prior to recovery of the payload. For example, the compensation to a mean luminance measure could be added to all stored detection values Referring to FIG. 8, a process 800 provides a general implementation that determines embedding metadata based on a reference. The process 800 thus has some similarity in functionality with the process 700.

The process 800 includes accessing variable-length encoded data that includes a reference indicator (810). That is, the variable-length encoded data includes an encoding (the reference indicator) of information identifying an actual reference used to predictively encode an image. The reference indicator, which is the encoding of the information identifying the actual reference, has a particular value. In one or more previously described examples, the reference indicator is the encoding of a value of the macroblock type field that identifies, through the corresponding intra-prediction mode, the reference used to predictively encode a macroblock.

The process 800 includes determining a location in the variable-length encoded data of the reference indicator (820). The location is used, for example, in creating the embedding metadata.

The process 800 also includes determining an alternative value for the reference indicator (830). The alternative value is different from the particular value. The alternative value is an encoding of alternative information that identifies a different reference different from the actual reference. All or part of the process 700 may be used, for example, in performing the operation 830. In one or more previously described examples, the alternative value is the encoding of a different value for the macroblock type field.

The process 800 may include various additional operations, such as, for example, designating the alternative value as a substitute (a watermark) for the particular value, evaluating the effectiveness of the alternative value as a watermark, or creating embedding metadata.

After creating a set of possible watermark replacements using, for example, the process 700 or the process 800, an implementation may select a subset of macroblocks to change. This selection is typically based on the payload requirements of the application, and any data coding applied to the payload. The selection is typically informed by the costs of each change (for example the fidelity and robustness costs as previously described). Usually, the selection will favor lower cost changes. In one implementation, the macroblocks are ranked according to the total cost for the best possible alternative for each macroblock (730 and 740). The macroblocks with the lowest total cost (for the best possible alternative) are selected for watermarking with the payload data.

Figure 9:
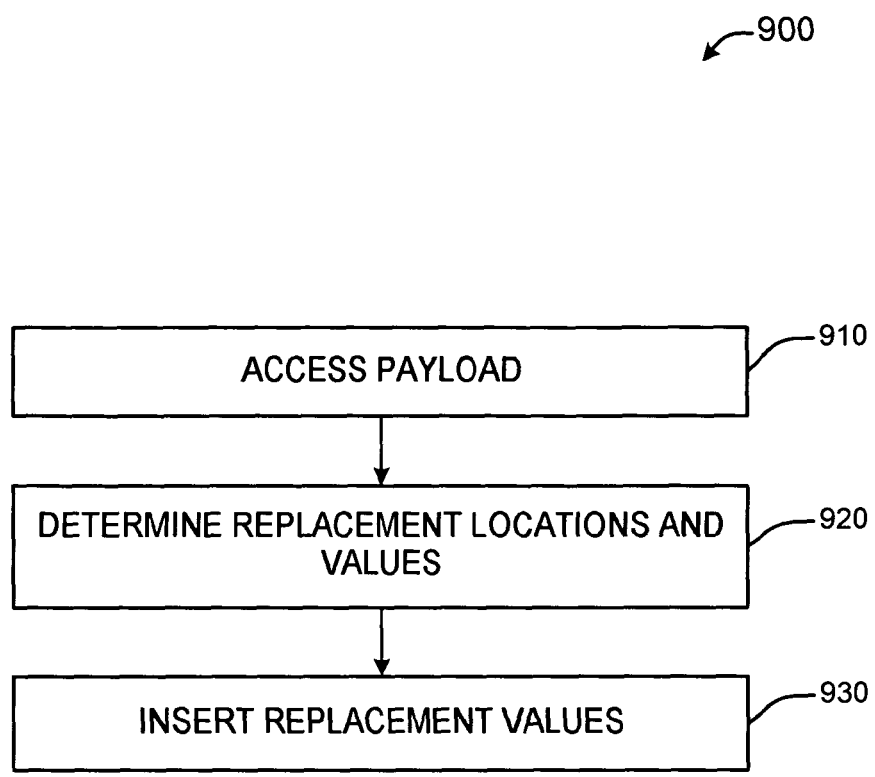
FIG. 9 is a flow diagram of an implementation for inserting replacement values.

Referring to FIG. 9, a process 900 is shown that describes an implementation for inserting replacement values, such as, for example, inserting a watermark. The process 900 includes accessing a payload (910). The accessed payload may be in bits or other symbols. Typically, the payload is in bits or is converted into bits. Additionally, the payload may be encoded.

The process 900 includes determining the replacement locations and replacement values (920). Operation 920 may be performed using, for example, the process 700, followed by a ranking process as just described. Operations 910 and 920 may be performed in either order. However, one implementation performs operation 910 first and also determines the number of payload bits, and then determines only the needed locations in operation 920 by, for example, selecting only the top ranking macroblocks until all payload bits have been assigned a macroblock. The operation 920 may be influenced by various other implementation requirements such as, for example, those discussed with respect to FIG. 7.

In at least one implementation, all or part of operation 920 is performed during a pre-processing stage. For example, in a pre-processing stage, a table may be prepared that includes embedding metadata. Then, in operation 920, the replacement values and locations may be determined by accessing the table.

The process 900 further includes inserting the replacement values, at the replacement locations (930) to provide, for example, a watermark. Inserting the replacement values involves replacing the existing coded data with the replacement values. The modified data may then be stored or transmitted, for example. These replacement actions are typically informed by a coded payload.

Figure 10:
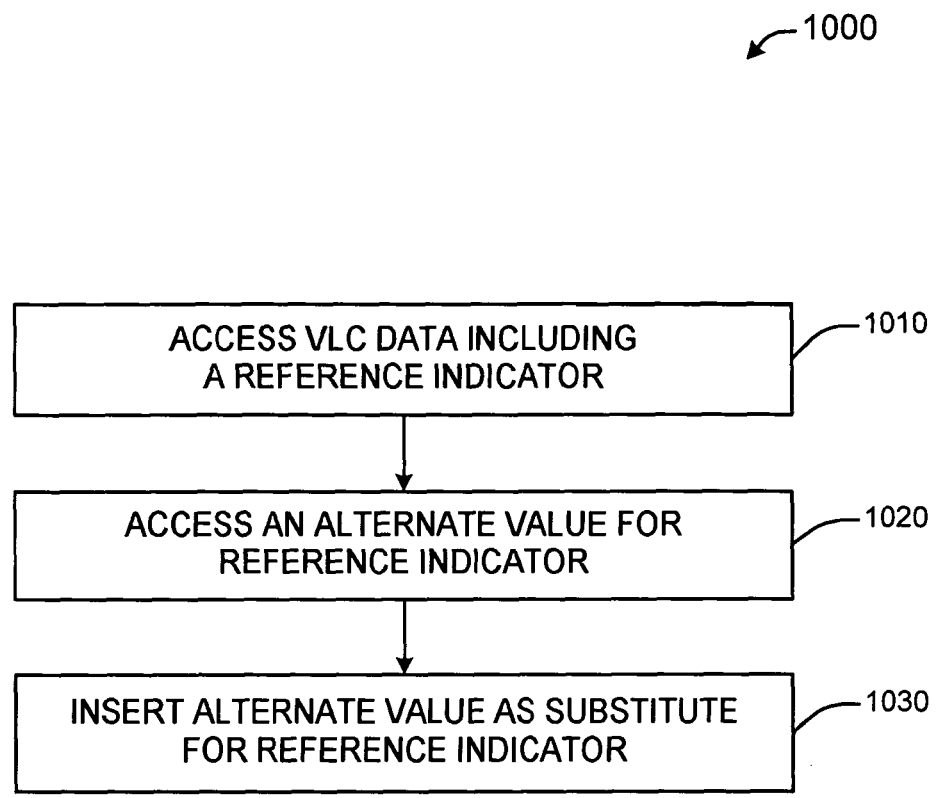
FIG. 10 is a flow diagram of an implementation for inserting alternative values for a reference indicator.

Referring to FIG. 10, a process 1000 is shown that describes a general implementation for inserting substitute values based on a reference. The process 1000 thus has some similarity in functionality with the process 900.

The process 1000 includes accessing variable-length encoded data that includes a reference indicator (1010). That is, the variable-length encoded data includes an encoding (the reference indicator) of information identifying an actual reference used to predictively encode an image. The reference indicator, which is the encoding of the information identifying the actual reference, has a particular value. In one or more previously described examples, the reference indicator is the encoding of a value of the macroblock type field that identifies, through the corresponding intra-prediction mode, the reference used to predictively encode a macroblock.

The process 1000 includes accessing an alternative value for the reference indicator (1020). The alternative value is different from the particular value. The alternative value is an encoding of alternative information that identifies a different reference different from the actual reference. The alternative value may be, for example, accessed from storage or computed in real-time. An implementation may, for example, access the alternative value from a table that is indexed by a location of the reference indicator.

The process 1000 includes inserting the alternative value as a substitute for the reference indicator (1030). The alternative value is inserted into the variable-length encoded data to watermark the image.

The process 1000 may include various additional operations, such as, for example, storing or transmitting the modified variable-length encoded data.

All or part of the data identifying locations of coded elements and possible replacement values, as accessed by 1020, can be stored on a storage device, or sent electronically. One implementation stores the locations and values on an apparatus such as a DVD, a hard disk, or other storage device. The apparatus includes a processor-readable medium having information stored thereon. The stored information identifies a replacement value for a portion of an encoded set of data. Another implementation provides a signal formatted to include the information that is stored on a processor-readable medium of this apparatus.

Additional implementations are directed to the result of various processes, such as, for example, results of the process 900 or the process 1000. For example, one implementation is an apparatus such as a DVD, a hard disk, or other storage device that includes modified encoded data, and another implementation is a signal formatted to include such modified encoded data. More specifically, one implementation is an apparatus that includes a processor-readable medium, the processor-readable medium having stored thereon encoded data including a modified portion. Another implementation is a signal formatted to include the encoded data that is stored on the processor-readable medium of this apparatus.

The above discussion describes a method for analyzing a target syntax element and identifying all, if any, acceptable alternative values that could be substituted by replacing a block of bits in the coded bitstream with an alternative block of bits. By examining all syntax elements in an AVC coded sequence, we can build a list of those for which there exists at least one acceptable alternative value. This is the list of "changeable syntax elements". For each syntax element that can be changed, we can build a list of the acceptable alternative values. Note that other implementations may change syntax elements other than macroblock type, and the underlying intra-prediction mode. Such other syntax elements include, for example, motion vectors, residue values or the encoding of residue values using DCT coefficients (for example), inter-prediction indicators of a reference picture or reference frame.

Various syntax elements relate to reference information, which means information that identifies a reference in some way. A reference refers generally to a set of information that is used as a basis for a prediction. A reference identifier generally refers to information that identifies a reference. For example, a reference may be identified by an intra-prediction mode of a block because the intra-prediction mode identifies the pixels used as the basis for a prediction of a current block. The intra-prediction mode also identifies the manner in which those identified pixels are used. A reference also may be identified by, for example, a motion vector, or an indicator of a previous frame or macroblock that is used as a basis for a prediction. Note that a given macroblock may have multiple reference identifiers and multiple references.

It should be clear that a reference, and/or a reference identifier, may exist for intra-predicted blocks and inter-predicted blocks. Intra-predicted blocks may use a reference identifier such as, for example, an intra-prediction mode or a macroblock type (which identifies the intra-prediction mode), and the reference may be, for example, a block or a set of pixels from the same picture. Inter-predicted blocks may use a reference identifier such as, for example, a motion vector, and the reference may be all or part of a different picture.

The goal of information embedding is to modify a subset of the syntax elements on the list of all changeable syntax elements, changing their values from their original values to one of the listed acceptable alternative values, in accordance with the payload. In one practical implementation, this is accomplished in three steps as shown above in FIG. 9.

As discussed above, the payload can be recovered from the AVC bitstream with the aid of the detection metadata. In some implementations, the detection metadata indicates the specific syntax elements that represent the payload information and the original values of those elements. If the embedding process used the original values to represent a '0' and the alternative value to represent a '1', the detector can compare the value in the bitstream with the original value stored in the detection data. If they match, the detector reports a '0' bit. If they do not match, the detector reports a '1' bit. If the embedding process replaced the original value with one of two alternative values, those two alternative values and their corresponding labels are recovered from the detection data. The detector then compares the value in the bitstream with one or more of the two alternatives and reports the corresponding label.

The payload data can also be recovered from the decoded pixel-domain imagery. This process is specific to the particular measure used in the subset selection process. In one practical implementation, the measure is the mean luminance of a block of pixels. The original mean luminance of each modified block is recovered from the detection data. The detector calculates the mean luminance of the specified block of pixels in the decoded image sequence and compares that value to the original value stored in the detection data. If the calculated value is higher than the original value, the detector reports a '1' bit. If the calculated value is lower than the original, the detector reports a '0' bit. Such an implementation stores the location and original value in the detection data, but does not need to store the expected detection values for a '0' bit or a '1' bit.

This recovery method could have problems if the decoded imagery is modified by a uniform change in luminance after decoding, but prior to detection. In order to address this, the mean luminance of a number of reference blocks can be stored in the detection data. These are blocks that are not changed by the embedding process. The detector can calculate the mean luminance of the reference blocks just prior to recovery and discover any luminance changes that are unrelated to the embedding process. These luminance changes can be compensated by adjusting the original values accordingly. At least one implementation adjusts for non-uniform luminance changes by using a reference block close to the watermarked block.

It should be clear that information embedding may include a variety of applications. One such application is watermarking in which a payload is embedded in a datastream. However, various information embedding applications may use different requirements. For example, it may be desirable to make a change to the datastream that results in a change that is perceivable by a user.

Figure 11:
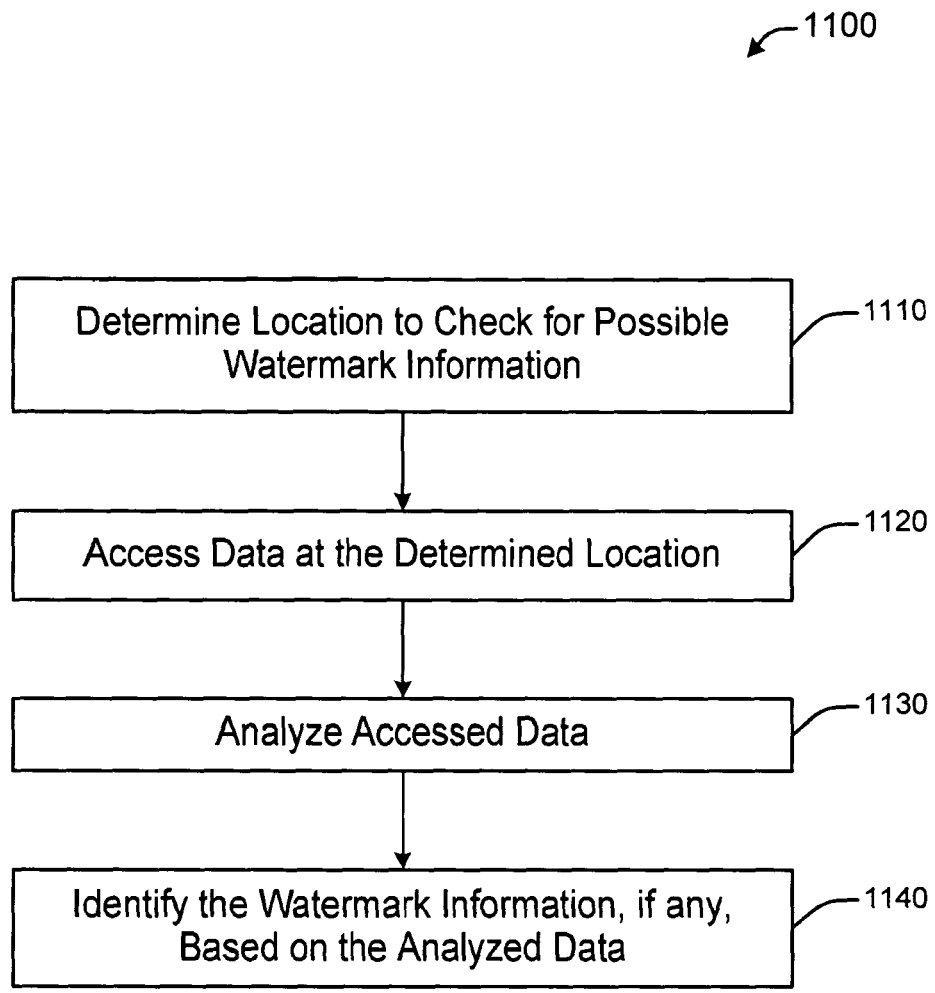
FIG. 11 is a flow diagram of an implementation for identifying a payload from watermarked data.

Referring to FIG. 11, a general process 1100 is shown for recovering payload information, or more generally, for detecting a watermark. The process 1100 may be applied to, for example, a coded and watermarked bitstream, or baseband data from a decoded watermarked bitstream.

The process 1100 includes determining a location to check for a possible watermark (1110). Note that this process may be applied to content that may or may not have had a watermarking process applied. Further, even if a watermarking process was applied, a payload bit may be embedded without changing the content (as previously described) Thus, the location that is checked may or may not have been modified. If the content has been previously watermarked, then this process is designed to recover the embedded payload. The process 1100 includes accessing (1120) and analyzing (1130) data from the determined location. The process 1100 further includes identifying the watermark information, if any watermark exists, based on the analysis (1140). The identified watermark information may be, for example, a sequence of bits (or other unit of information) or a detection value determined for a macroblock (or other unit of a picture).

The process 1100 may be repeated for one or more other locations to identify one or more additional bits that make up a payload. Thus, an entire payload may be recovered using the process 1100.

Implementations of the process 1100 include analyzing a modified bitstream as well as analyzing baseband data (for example, pixel domain data or audio data). For example, a bitstream may be modified by modifying bits associated with a target element, according to one of the implementations previously described. A watermark may be detected in such a bitstream by accessing the appropriate bit locations and testing for the modification at those locations. The bit locations and modified values (or possible modified values), such as found in the embedding metadata, may also be included in the detection data.

Alternatively, or in addition, such a modified bitstream may be decoded and possibly subject to other processing, including re-encoding. In the case of re-encoding, such a re-encoded bitstream will not be expected to include the same modified target element, at the same location, as in the original modified bitstream. However, the re-encoded bitstream may be decoded to produce a baseband (for example, pixel-domain or audio clip) digital representation in which an effect of the original modification is still typically present. Thus, detection data will be useful that identifies the frame and block number in which the original modification had its impact. For example, the target element may have originally been a motion vector for a particular block, and the impact of modifying the motion vector may have been an increase in the mean luminance of that particular block or set of blocks. That increase in mean luminance may be preserved despite the processing of the original modified bitstream. However, the motion vector, and the original change to the motion vector will typically not be exactly the same after re-encoding.

Figure 12:
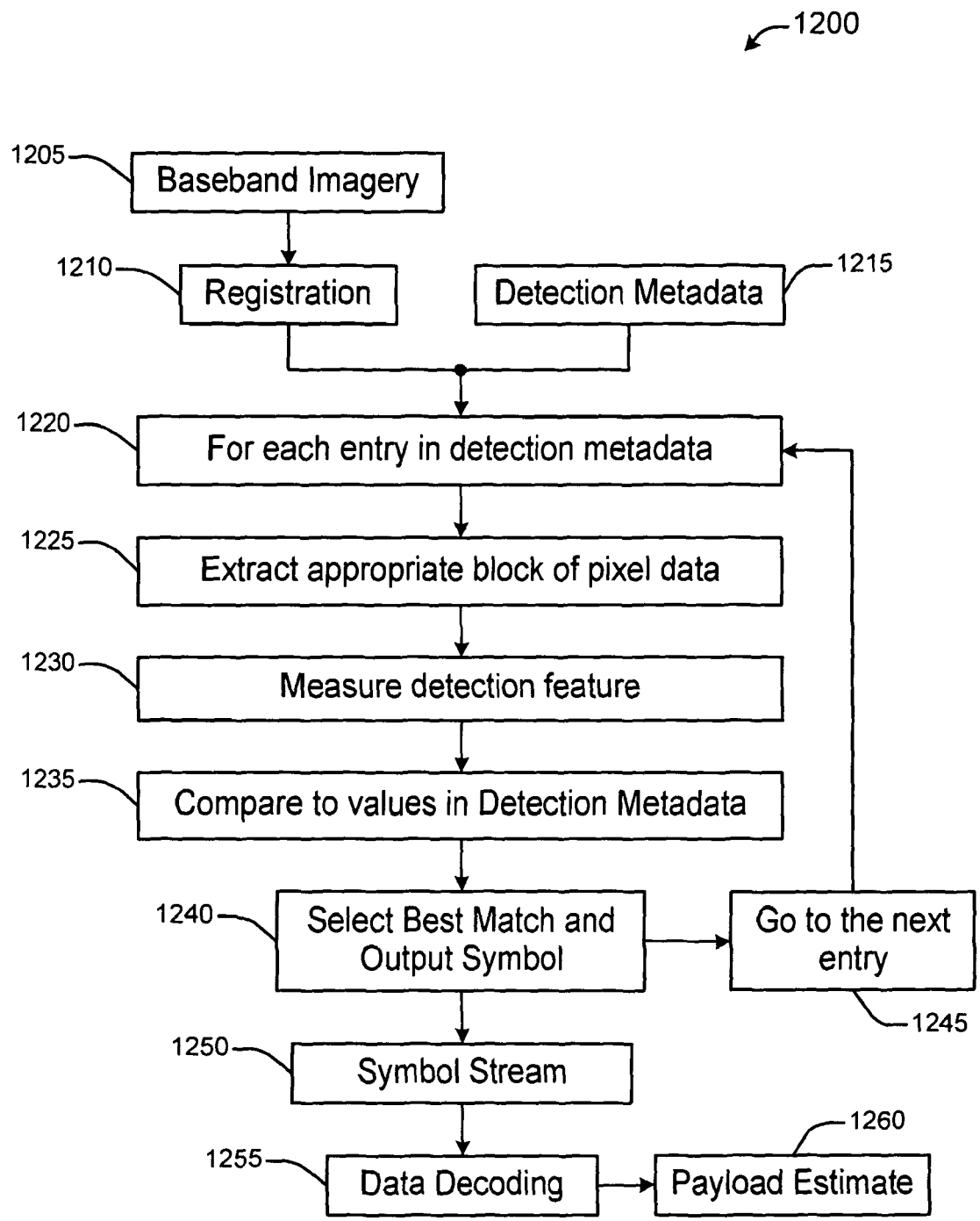
FIG. 12 is a flow diagram of an implementation for identifying a payload from watermarked image data.

Referring to FIG. 12, a process 1200 is shown that describes an implementation of the process 1100 for specific use with baseband imagery (that is, pixel data) and including specific operations tailored to baseband imagery. However, if compressed data is accessed (for example, is retrieved from storage or received in a transmission) instead of baseband imagery, we can decode the compressed data to obtain the baseband imagery.

The process 1200 includes accessing baseband imagery (1205), and optionally performing temporal and/or geometric registration (1210). Registration may be necessary because the detection metadata may describe each change by, for example, frame number and block position within the frame. Accordingly, registration facilitates the proper identification of the frame number and block. There are many approaches for obtaining this registration, and the implementation is independent of the registration approach, so various approaches may be used.

The process 1200 includes accessing the detection metadata (1215). Each entry in the detection metadata may define a change by, for example, its frame position and block within the frame. For each entry, a loop (1220) is performed that may generally be defined to include operations 1225-1245.

For each entry in the detection metadata, the corresponding block of pixel data is extracted from the baseband imagery (1225). From the extracted block, the detection feature is measured, calculated, or otherwise determined (1230). In one example above, the detection feature is the mean luminance, and in another example the detection feature is the variance.

The process 1200, and the loop (1220), includes comparing the determined detection feature to the detection metadata (1235). This comparison includes, in one implementation, comparing the determined feature, for example a mean luminance value, to two mean luminance values in the detection metadata. The best match is selected and its corresponding symbol is output (1240). One implementation identifies the best match as the stored detection value that is closest to the determined detection feature. Other implementations may apply, for example, a non-linear evaluation to determine the best match.

The process 1200, and the loop (1220), further includes looping back to go the next intra-prediction coded block that is indicated in the detection metadata (1245). The loop (1220) repeats for all blocks indicated in the detection metadata.

Each iteration through the loop (1220) outputs a symbol from the operation (1240), and the result is a symbol stream (1250). The symbol stream is, optionally, decoded (1255). Note that implementations need not have encoded the payload bits. If a data coding process was applied to the payload (for example, as in data coder 120 in FIG. 1), then the corresponding data decoding process is applied to the symbol stream yielding the recovered payload which is referred to as the payload estimate (1260).

The payload estimate (1260) corresponds to the decoded symbol stream, or (if the payload was not coded) to the symbol stream. In typical implementations, the symbols output from the operation (1240) are bits, but other implementations may encode symbols other than bits.

As discussed above, when mean luminance is used as the detection feature, the system can become confused by global changes in brightness. In other words, a global increase in brightness can cause the luminance extracted from the baseband imagery to always be closer to the brighter of the two values stored in the metadata. Thus, the symbol stream may (erroneously) consist of all '1' bits. To counter this, an embedder can add a number of reference entries into the detection information. A reference entry lists a frame number, block position, and original luminance value of the block for a block that is not affected by the watermarking process. The detector can read out the reference values and compare these to the corresponding values seen in the baseband imagery. The baseband imagery can then be adjusted (perhaps during registration) such that the measured luminance in the reference blocks matches that listed in the detection metadata file.

Various implementations of the process 900 or the process 1200 use stored detection metadata that includes one or more of a variety of pieces of data. For example, the detection metadata may include location information identifying the locations to check for a possible watermark. The location information may include, for example, a frame identifier and/or a block identifier.

Detection metadata may include, for example, a benchmark value for a feature. The benchmark may be, for example, the value of the feature before the location was modified. The benchmark may be, for example, compared to the actual value (the new benchmark) of the feature for the accessed location (1120) to provide an indication of the change. For example, the comparison may indicate whether the value (the benchmark) has increased or decreased as a result of the modification.

Detection metadata may include, for example, a base value for a feature from a different (non-watermarked) location. Such a base value may be, for example, the mean luminance of a non-watermarked location. The base value may be used, as explained earlier, to determine if there was a change to the data that affected more than the watermarked location. In certain circumstances, there may have been a global change (for example, a change to an entire frame). For example, the mean luminance of an entire frame may have been changed. The base value can then be compared to the new value of the feature at the non-watermarked location (a new base value). If the difference is more than a threshold, then it may be determined that a global change occurred. Alternatively, the difference may simply be taken to be a global difference, and the difference may be added to the value (the new benchmark) determined for the (possible) watermarked location to account for the global change. Note that in this alternative, the difference may (alternatively) be added to the benchmark instead of the value (the new benchmark). Further, in certain implementations a ratio may be determined between the base value and the new base value, and either the benchmark or the new benchmark may be multiplied by the ratio.

Figure 13:
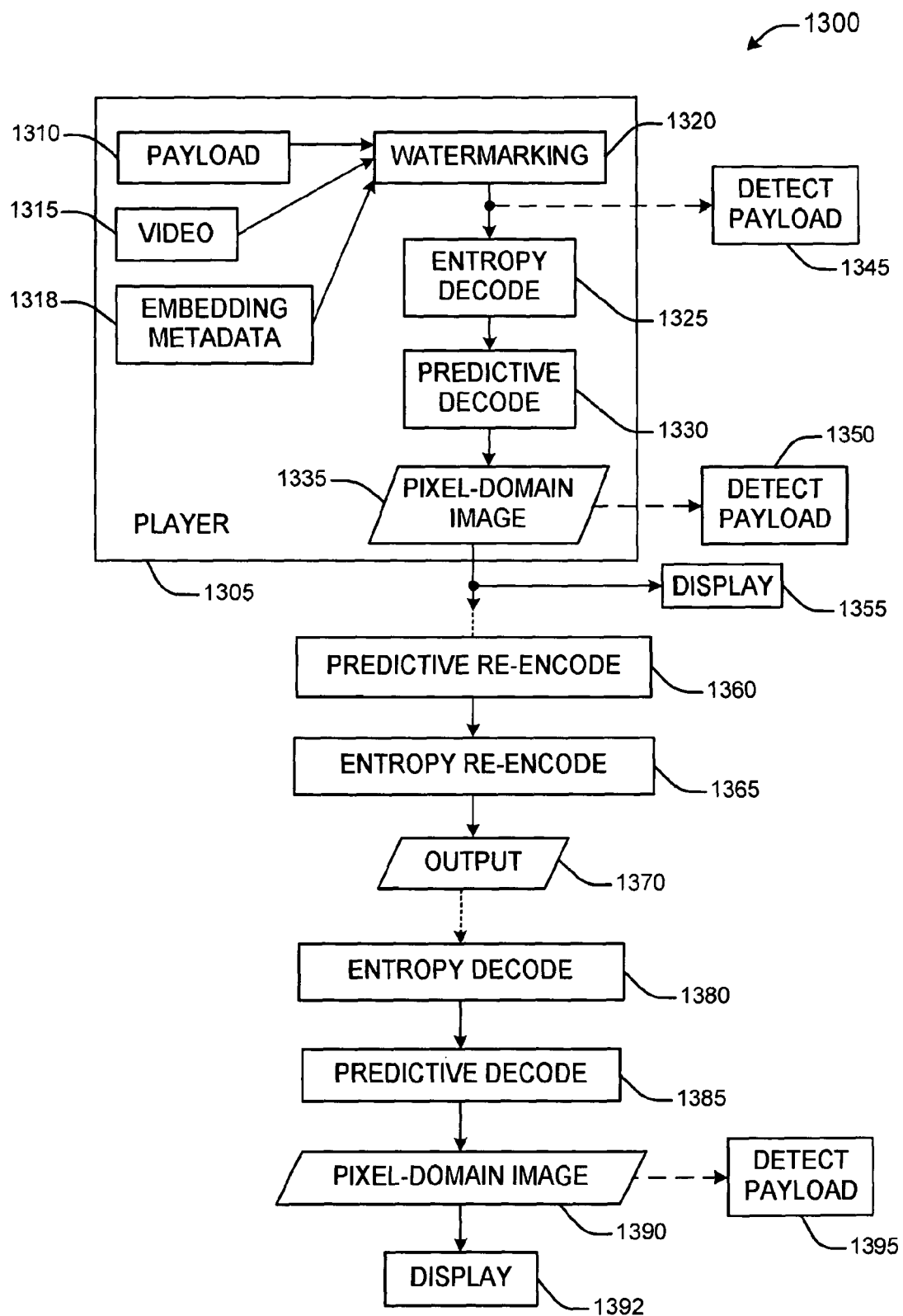
FIG. 13 is a block diagram of an implementation for watermarking content and for detecting a payload.

Referring to FIG. 13, a system 1300 provides a player 1305 for watermarking video (other types of content may also be watermarked) using pre-prepared embedding information (referred to as embedding metadata). The watermarked video is provided for display. The system 1300 also provides for re-encoding the video that is provided for display, such as may occur, for example, when an unauthorized copy of the video is re-encoded. The system 1300 further provides for decoding the re-encoding, and for detecting the original payload at one or more points in the overall system. The system 1300 also serves as a flow chart for one or more processes.

The player 1305 includes a payload 1310, a video 1315, and embedding metadata 1318. The player 1305 includes a watermarking unit 1320 that receives the payload 1310, the video 1315, and the embedding metadata 1318, and that provides a watermarked video. The payload may be detected from the watermarked video by a payload detector 1345.

The player 1305 includes an entropy decoder 1325 that receives the watermarked video and performs entropy decoding. The player 1305 further includes a predictive decoder 1330 that receives the entropy decoded stream from the entropy decoder 1325 and performs predictive decoding to produce a pixel-domain image 1335. The pixel-domain image may be provided to a display 1355, or to a payload detector 1350 that operates on baseband data.

The pixel-domain image also may be provided to a predictive re-encoder 1360 followed by an entropy re-encoder to re-encode the pixel-domain image into an encoded output 1370. The encoded output 1370 may be, for example, an AVC-compatible bitstream. The encoded output 1370 may be stored, for example, on a recordable medium for distribution. The predictive re-encoder 1360 and the entropy re-encoder 1365 may be part of a device that is separate from the player 1305 and that is for producing unauthorized copies of content (represented by the output 1370).

The encoded output 1370 may be provided, for example, to an entropy decoder 1380 (which may be the same as the entropy decoder 1325) followed by a predictive decoder 1385 (which may be the same as the predictive decoder 1330) to decode the encoded output 1370 into a pixel-domain image 1390. The pixel-domain image 1390 may be provided to a display 1392 and/or to a payload detector 1395 (which may be the same as payload detector 1350). The entropy decoder 1380 and the predictive decoder 1385 may be part of a device separate from the player 1305 and the predictive re-encoder 1360 and the entropy re-encoder 1365. For example, one such separate device may be geographically located at a payload detection facility that receives and analyzes unauthorized copies (represented by the output 1370) of content.

Clearly the process 900, or other processes described in this application, may be performed by a variety of devices, including processing devices. Such devices may also include a storage device for storing data, such as, for example, the accessed data, the benchmark value, the base value, and the location(s) of possible watermark information. Further, the process 900, or other processes described in this application, may be embodied in a set of instructions as well.

Features and aspects of described implementations may be applied to various applications. Applications include, for example, watermarking discs such as, for example, DVDs or other discs, and watermarking digital streams. Watermarking of discs may be performed in various manners, for example, at duplication of the discs. Watermarking of digital streams may also be performed in various manners, for example, at playback, broadcast, download, or other transfer of a digital stream. These features and aspects may also be adapted for other application areas. For example, a coded bitstream could be modified for purposes other than watermarking. One example includes embedding a message intended for a viewer to see. Further, the message could be varied based on a payload or other criterion. Further, although the described implementations focused primarily on variable length coding, other applications may apply the same concepts to other coding techniques.

The concepts, implementations, and features described in this application may be applied, for example, at various stages in a typical DVD creation, distribution, and playback process. For example, the concepts and features may be employed in:

1. Pre-processing the content to determine the replacement values. Replacement values need not be inserted at this stage, but may be stored, for example, in a data structure (for example, a table) for future insertion.

2. The data structure mentioned in item 1 above, or a signal conveying the data structure, or a processor-readable medium that stores the data structure. Such a medium may contain, for example, both the data structure and the unmodified content.

3. Inserting the replacement values from item 1 above into the content.

4. The modified content produced from item 3 above, either in a data structure, a signal conveying the modified content, or a processor-readable medium storing the modified content.

5. Decoding the modified content of item 4 above to produce baseband data, such as, for example, pixel data (if images are encoded) or audio data (if audio is encoded).

6. The decoded content itself from item 5 above, which is modified content that may include a watermark. The decoded content may be, for example, in a data structure, a signal conveying the decoded content, or a processor-readable medium storing at least temporarily the decoded content.

7. Displaying, or more generally presenting, the decoded content of item 6 above. Also includes providing for display or presentation.

8. Re-encoding the decoded content from item 6 above, such that the detection feature (that resulted from the modification) is retained even though the encoded bits might be different from those provided in item 4 above.

9. A data structure containing the re-encoded content from item 8. Or a signal formatting and conveying the re-encoded content. Or a processor-readable medium storing the re-encoded content.

10. Decoding the re-encoded content of item 8 above to produce baseband data.

11. The baseband data produced by decoding in item 10 above. The baseband data may be, for example, in a data structure, a signal conveying the baseband data, or a processor-readable medium storing at least temporarily the baseband data.

12. Displaying, or more generally presenting, the baseband data of item 11 above. Also includes providing for display or presentation.

13. Detecting a payload (for example, a watermark) from the modified content of item 4 above.

14. Detecting a payload from the baseband data of item 5 above.

15. Detecting a payload, if the encoded bits allow, from the re-encoded content of items 8 and 9 above.

16. Detecting a payload from the baseband data of item 11 above.

Note that if headers are used for various sections of this disclosure, then the header of a given section is not to be construed as limiting the disclosure of that section to the topic of the header, nor as limiting the disclosure of other sections to topics other than that of the header. Such headers are exemplary, and are intended as a general aid to the reader. Such headers are not intended to constrain the flow of the disclosure nor to restrict the applicability or generality of the disclosure.

A watermark, as used in this application, may refer to various items. For example, a watermark may refer to data modified or inserted to allow subsequent detection, or to the resulting baseband modification.

As should be clear, a syntax element may represent one or more of various different types of information. For example, a syntax element may be a motion vector, a residue DCT coefficient, a macroblock type, a quantization parameter, or a flag. Accordingly, syntax elements need not all have the same length but can have various different lengths. Various implementations disclosed in this application may work on any type of syntax element, regardless of what type of information is represented by the syntax element and regardless of the size/length of the syntax element.

Various implementations are described in terms of a picture, a frame, or a block, for example. However, the concepts, implementations, and features described in this application generally apply to an image, and that image may be (or include) one or more pixels, blocks, slices, fields, frames, pictures, or sequences.

Additionally, many implementations are described in terms of video data. However, the concepts, implementations, and features are generally equally applicable to audio data and other types of coded data.

Two devices or components are said to be coupled if the two devices are directly connected or indirectly connected. Directly connected devices have no intervening devices between the connected devices. Indirectly connected devices have one or more intervening devices between the connected devices.

Further, many implementations are described with respect to AVC. However, the concepts, implementations, and features (1) need not be restricted to a standard-environment, but may be applied to environments in which no standard is used, (2) are certainly not restricted to AVC, (3) generally apply to other known standards, and (4) will generally be applicable in some respect at least to future-developed standards. Other standards may include AVC-related standards which refer generally to other standards that are based on, or are similar to, AVC (with or without its extensions).

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding, or equipment or applications associated with content production. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium having instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method for determining a watermark, the method comprising:
accessing variable-length encoded data including an encoding of information identifying an actual reference used to predictively encode an image, the encoding of the information having a particular value, and the variable-length encoded data also including an encoding of a residue produced from predictively encoding the image based on the actual reference; and
determining an alternative value that is different from the particular value, such that the alternative value is an encoding of alternative information that identifies a different reference from the actual reference, wherein the alternative value is for use in watermarking the variable-length encoded data by inserting the alternative value into the variable-length encoded data as a substitute for the particular value and by also retaining in the variable-length encoded data the residue produced from predictively encoding the image based on the actual reference.

2. The method of claim 1 further comprising designating the alternative value as a substitute for the particular value for use in watermarking the variable-length encoded data.

3. The method of claim 2 further comprising evaluating effectiveness of using the alternative value, in place of the current value, as a watermark, and
wherein designating the alternative value as a substitute is based on a result of evaluating effectiveness.

4. The method of claim 3 wherein evaluating comprises determining a cost for the alternative value based on fidelity of the watermark and robustness of the watermark.

5. The method of claim 3 further comprising:
evaluating effectiveness of an additional alternative value; and
determining, based on results from evaluating the alternative value and evaluating the additional alternative value, that the alternative value is more effective, and
wherein designating the alternative value as a substitute is based on determining that the alternative value is more effective.

6. The method of claim 5 wherein:
the particular value identifies a first value for a macroblock type field for an intra-predicted 16×16 macroblock in H.264/AVC or a related standard, the first value indicating a first intra-prediction mode,
the alternative value identifies a second value for a macroblock type field for an intra-predicted 16×16 macroblock in H.264/AVC or a related standard, the second value indicating a second intra-prediction mode, and
the additional alternative value identifies a third value for a macroblock type field for an intra-predicted 16×16 macroblock in H.264/AVC or a related standard, the third value indicating a third intra-prediction mode.

7. The method of claim 6 wherein a CAVLC encoding of each of the first value, the second value, and the third value uses the same number of bits.

8. The method of claim 1 further comprising:
inserting into a table the alternative value;
determining location of the particular value in the variable-length encoded data; and
inserting into the table information identifying the location in the variable-length encoded data at which the particular value is located, the location being where the alternative value would be inserted into the variable-length encoded data to replace the particular value.

9. The method of claim 1 further comprising replacing the particular value with the alternative value in the variable-length encoded data.

10. The method of claim 1 wherein the information identifying the actual reference identifies pixel locations of blocks that are adjacent to a current block, wherein the values of the pixel locations are used to predict at least a portion of the current block.

11. The method of claim 1 wherein the information identifying the actual reference identifies a reference block or a reference picture.

12. The method of claim 1 wherein the information identifying the actual reference comprises a macroblock type field in H.264/AVC or a related standard.

13. The method of claim 1 wherein the information identifying the actual reference comprises a macroblock type field for an intra-predicted 16×16 macroblock in H.264/AVC or a related standard.

14. The method of claim 1 wherein the information identifying the actual reference comprises a prediction mode in H.264/AVC or a related standard.

15. The method of claim 1 wherein the information identifying the actual reference comprises a motion vector.

16. The method of claim 1 wherein the variable-length encoded data further includes an encoding of information identifying a current residue resulting from predicting the image with the current reference.

17. The method of claim 1 wherein:
the variable-length encoded data has been encoded using a particular variable-length code, and the alternative value encodes the alternative information using the particular variable-length code.

18. An apparatus for determining a watermark, the apparatus comprising:
an entropy decoder to decode variable-length encoded data including an encoding of information identifying an actual reference used to predictively encode an image, the encoding of the information having a particular value, and the variable-length encoded data also including an encoding of a residue produced from predictively encoding the image based on the actual reference; and
a watermark generator, coupled to the entropy decoder, to determine an alternative value that is different from the particular value, such that the alternative value is an encoding of alternative information that identifies a different reference from the actual reference, wherein the alternative value is for use in watermarking the variable-length encoded data by inserting the alternative value into the variable-length encoded data as a substitute for the particular value and by also retaining in the variable-length encoded data the residue produced from predictively encoding the image based on the actual reference.

19. The apparatus of claim 18 wherein the watermark generator is configured to create metadata for use in watermarking the variable-length encoded data, the metadata including (1) the alternative value and (2) a location of the particular value in the variable-length encoded data, and the metadata associating the alternative value and the location.

20. An apparatus for determining a watermark, the apparatus comprising:
means for accessing variable-length encoded data including an encoding of information identifying an actual reference used to predictively encode an image, the encoding of the information having a particular value, and the variable-length encoded data also including an encoding of a residue produced from predictively encoding the image based on the actual reference; and
means for determining an alternative value that is different from the particular value, such that the alternative value is an encoding of alternative information that identifies a different reference from the actual reference, wherein the alternative value is for use in watermarking the variable-length encoded data by inserting the alternative value into the variable-length encoded data as a substitute for the particular value and by also retaining in the variable-length encoded data the residue produced from predictively encoding the image based on the actual reference.

21. A processor configured to perform at least the following:
accessing variable-length encoded data including an encoding of information identifying an actual reference used to predictively encode an image, the encoding of the information having a particular value, and the variable-length encoded data also including an encoding of a residue produced from predictively encoding the image based on the actual reference; and
determining an alternative value that is different from the particular value, such that the alternative value is an encoding of alternative information that identifies a different reference from the actual reference, wherein the alternative value is for use in watermarking the variable-length encoded data by inserting the alternative value into the variable-length encoded data as a substitute for the particular value and by also retaining in the variable-length encoded data the residue produced from predictively encoding the image based on the actual reference.

22. A non-transitory processor-readable medium having stored thereon instructions for performing at least the following:
accessing variable-length encoded data including an encoding of information identifying an actual reference used to predictively encode an image, the encoding of the information having a particular value, and the variable-length encoded data also including an encoding of a residue produced from predictively encoding the image based on the actual reference; and
determining an alternative value that is different from the particular value, such that the alternative value is an encoding of alternative information that identifies a different reference from the actual reference, wherein the alternative value is for use in watermarking the variable-length encoded data by inserting the alternative value into the variable-length encoded data as a substitute for the particular value and by also retaining in the variable-length encoded data the residue produced from predictively encoding the image based on the actual reference.

23. A non-transitory processor-readable medium having watermark data stored thereon,
the watermark data for use in watermarking variable-length encoded data that includes an encoding of information identifying an actual reference used to predictively encode an image, the encoding of the information having a particular value, and the variable-length encoded data also including an encoding of a residue produced from predictively encoding the image based on the actual reference, and
the watermark data including an alternative value that is different from the particular value, such that the alternative value is an encoding of alternative information that identifies a different reference from the actual reference, the alternative value being a substitute for the particular value for use in watermarking the variable-length encoded data by inserting the alternative value into the variable-length encoded data as a substitute for the particular value and by also retaining in the variable-length encoded data the residue produced from predictively encoding the image based on the actual reference.

24. The processor-readable medium of claim 23 wherein the processor-readable medium has stored thereon the variable-length encoded data that includes the encoding of information identifying the actual reference used to predictively encode the image, the encoding of the information having the particular value.

25. A method for watermarking, the method comprising:
accessing variable-length encoded data including an encoding of information identifying an actual reference used to predictively encode an image, the encoding of the information having a particular value, and the variable-length encoded data also including an encoding of a residue produced from predictively encoding the image based on the actual reference;
accessing an alternative value that is different from the particular value, such that the alternative value is an encoding of alternative information that identifies a different reference from the actual reference; and
inserting the alternative value into the variable-length encoded data as a substitute for the particular value to watermark the image, wherein the variable-length encoded data includes the alternative value encoding the alternative information identifying the different reference and also includes the residue produced from predictively encoding the image based on the actual reference.

26. The method of claim 25 wherein:
accessing the variable-length encoded data occurs in response to a request for presentation of the variable-length encoded data, and
processing operations to determine the alternative value have been performed prior to the accessing of the variable-length encoded data, such that upon receiving the request for presentation of the variable-length encoded data and subsequently accessing the variable-length encoded data, the alternative value may be inserted without needing to determine the alternative value.

27. The method of claim 25 further comprising performing processing operations to determine the alternative value, prior to accessing the alternative value.

28. An apparatus comprising a stream modification unit configured to perform at least the following:
accessing variable-length encoded data including an encoding of information identifying an actual reference used to predictively encode an image, the encoding of the information having a particular value, and the variable-length encoded data also including an encoding of a residue produced from predictively encoding the image based on the actual reference;
accessing an alternative value that is different from the particular value, such that the alternative value is an encoding of alternative information that identifies a different reference from the actual reference; and
inserting the alternative value into the variable-length encoded data as a substitute for the particular value to watermark the image, wherein the variable-length encoded data includes the alternative value encoding the alternative information identifying the different reference also includes the residue produced from predictively encoding the image based on the actual reference.

29. The apparatus of claim 28 further comprising a DVD reader, and wherein the apparatus is a DVD player.

30. An apparatus for watermarking, the apparatus comprising:
means for accessing variable-length encoded data including an encoding of information identifying an actual reference used to predictively encode an image, the encoding of the information having a particular value and the variable-length encoded data also including an encoding of a residue produced from predictively encoding the image based on the actual reference;
means for accessing an alternative value that is different from the particular value, such that the alternative value is an encoding of alternative information that identifies a different reference from the actual reference; and
means for inserting the alternative value into the variable-length encoded data as a substitute for the particular value to watermark the image wherein the variable-length encoded data includes the alternative value encoding the alternative information identifying the different reference and also includes the residue produced from predictively encoding the image based on the actual reference.

31. A non-transitory processor configured to perform at least the following:
accessing variable-length encoded data including an encoding of information identifying an actual reference used to predictively encode an image, the encoding of the information having a particular value, and the variable-length encoded data also including an encoding of a residue produced from predictively encoding the image based on the actual reference;
accessing an alternative value that is different from the particular value, such that the alternative value is an encoding of alternative information that identifies a different reference from the actual reference; and
inserting the alternative value into the variable-length encoded data as a substitute for the particular value to watermark the image, wherein the variable-length encoded data includes the alternative value encoding the alternative information identifying the different reference and also includes the residue produced from predictively encoding the image based on the actual reference.

32. A non-transitory processor-readable medium having stored thereon instructions for performing at least the following:
accessing variable-length encoded data including an encoding of information identifying an actual reference used to predictively encode an image, the encoding of the information having a particular value, and the variable-length encoded data also including an encoding of a residue produced from predictively encoding the image based on the actual reference;
accessing an alternative value that is different from the particular value, such that the alternative value is an encoding of alternative information that identifies a different reference from the actual reference; and
inserting the alternative value into the variable-length encoded data as a substitute for the particular value to watermark the image, wherein the variable-length encoded data includes the alternative value encoding the alternative information identifying the different reference and also includes the residue produced from predictively encoding the image based on the actual reference.

33. A non-transitory processor-readable medium having stored thereon variable-length encoded data for an encoding of an image, the variable-length encoded data comprising an encoding of information identifying an alternative reference that is different from the actual reference used to predictively encode the image, wherein:
the information identifying the alternative reference provides a watermark for the image,
the variable-length encoded data stored on the medium further comprises an encoding of information identifying a residue from predictively encoding the image using the actual reference, and
the variable-length encoded data includes the alternative value encoding the alternative information identifying the different reference and also includes the residue produced from predictively encoding the image based on the actual reference.

34. A method for decoding, the method comprising:
decoding variable-length encoded data for an encoding of an image, the variable-length encoded data comprising an encoding of information identifying an alternative reference that is different from an actual reference used in predictively encoding the image, wherein the information identifying the alternative reference provides a watermark for the image,
wherein the variable-length encoded data further comprises an encoding of information identifying a residue from predictively encoding the image using the actual reference.

35. The method of claim 34 wherein the variable-length encoded data further comprises an encoding of information identifying a residue from predictively encoding the image using the actual reference.

36. The method of claim 34 wherein decoding comprises decoding the variable-length code and the predictive code.

37. The method of claim 34 wherein decoding produces a baseband reconstruction of the image that varies from the original image by including a detectable feature arising from the use of the information identifying the alternative reference as a watermark.

38. An apparatus comprising a decoder configured to decode variable-length encoded data for an encoding of an image, the variable-length encoded data comprising an encoding of information identifying an alternative reference that is different from an actual reference used in predictively encoding the image, wherein the information identifying the alternative reference provides a watermark for the image,
wherein the variable-length encoded data further comprises an encoding of information identifying a residue from predictively encoding the image using the actual reference.

39. An apparatus comprising:
means for decoding variable-length encoded data for an encoding of an image, the variable-length encoded data comprising an encoding of information identifying an alternative reference that is different from an actual reference used in predictively encoding the image, wherein the information identifying the alternative reference provides a watermark for the image,
wherein the variable-length encoded data further comprises an encoding of information identifying a residue from predictively encoding the image using the actual reference.

40. The apparatus of claim 39 further comprising memory means for storing the variable-length encoded data.

41. A processor configured to decode variable-length encoded data for an encoding of an image, the variable-length encoded data comprising an encoding of information identifying an alternative reference that is different from an actual reference used in predictively encoding the image, wherein the information identifying the alternative reference provides a watermark for the image,
wherein the variable-length encoded data further comprises an encoding of information identifying a residue from predictively encoding the image using the actual reference.

42. A processor-readable medium having stored thereon instructions for decoding variable-length encoded data for an encoding of an image, the variable-length encoded data comprising an encoding of information identifying an alternative reference that is different from an actual reference used in predictively encoding the image, wherein the information identifying the alternative reference provides a watermark for the image,
wherein the variable-length encoded data further comprises an encoding of information identifying a residue from predictively encoding the image using the actual reference.

43. A non-transitory processor-readable medium having stored thereon a pixel-domain image that includes a detectable feature arising from a watermark of a variable-length encoding of one or more syntax elements from a predictive encoding of the image, the variable-length encoding having included an encoding of information identifying an alternative reference that is different from an actual reference used in predictively encoding the image, wherein the information identifying the alternative reference provided the watermark for the image,
wherein the variable-length encoded data further comprises an encoding of information identifying a residue from predictively encoding the image using the actual reference.

44. A method comprising providing for display a pixel-domain image that includes a detectable feature arising from a watermark of a variable-length encoding of one or more syntax elements from a predictive encoding of the image, the variable-length encoding having included an encoding of information identifying an alternative reference that is different from an actual reference used in predictively encoding the image,
wherein the information identifying the alternative reference provided the watermark for the image,
wherein the variable-length encoded data further comprises an encoding of information identifying a residue from predictively encoding the image using the actual reference.

45. A method comprising:
variable-length encoding a predictive encoding of a watermarked version of an image, the variable-length encoded data comprising an indicator of a current reference used in encoding the watermarked version of the image and an indicator of a resulting residue, the watermarked version of the image having a detectable characteristic that provides a watermark,
wherein the detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

46. A non-transitory processor-readable medium having stored thereon:
variable-length encoded data from a variable-length encoding of a predictive encoding of a watermarked version of an image, the variable-length encoded data comprising an indicator of a current reference used in encoding the watermarked version of the image and an indicator of a resulting residue, the watermarked version of the image having a detectable characteristic that provides a watermark,
wherein the detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

47. A method comprising decoding variable-length encoded data from a variable-length encoding of a predictive encoding of a watermarked version of an image, the variable-length encoded data comprising an indicator of a current reference used in encoding the watermarked version of the image and an indicator of a resulting residue, the watermarked version of the image having a detectable characteristic that provides a watermark, wherein the detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

48. A non-transitory processor-readable medium having stored thereon pixel-domain image data resulting from decoding variable-length encoded data from a variable-length encoding of a predictive encoding of a watermarked version of an image, the variable-length encoded data comprising an indicator of a current reference used in encoding the watermarked version of the image and an indicator of a resulting residue, the watermarked version of the image having a detectable characteristic that provides a watermark, wherein the detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

49. A method comprising providing for display pixel-domain image data resulting from decoding variable-length encoded data from a variable-length encoding of a predictive encoding of a watermarked version of an image, the variable-length encoded data comprising an indicator of a current reference used in encoding the watermarked version of the image and an indicator of a resulting residue, the watermarked version of the image having a detectable characteristic that provides a watermark, wherein the detectable characteristic results from (1) modifying a previous variable-length encoding of a previous predictive-encoding of the image, the previous predictive-encoding being based on a previous reference and including information identifying the previous reference, wherein the modifying includes distorting the information in order to indicate an alternative reference and to provide the detectable characteristic for the image, and (2) decoding the previous variable-length encoding and the previous predictive-encoding of the image to produce the watermarked version of the image in which the detectable characteristic is present.

50. A method for determining payload information, the method comprising:

accessing information that identifies a location in variable-length encoded data at which a variable-length encoding of information is located, the information identifying one of at least two references associated with a predictive encoding of an image;

accessing the encoding of the information at the location in the variable-length encoded data, wherein the information also identifies a residue resulting from predictively encoding the image using a reference other than the identified reference;

determining, based on the encoding of the information, which of the at least two references is identified; and determining payload information based on a result of determining which of the at least two references is identified.

51. The method of claim 50 wherein the identified reference is different from an actual reference used in the predictive encoding of the image, and variable-length encoding the identified reference rather than the actual reference provided a watermark for the image.

52. A method for determining payload information, the method comprising:

accessing a pixel-domain image that includes a detectable feature arising from a watermark of a variable-length encoding of one or more syntax elements from a predictive encoding of the image, the variable-length encoding including an encoding of information identifying an alternative reference that is different from an actual reference used in predictively encoding the image, wherein the information identifying the alternative reference provided the watermark for the image;

accessing detection metadata indicating a location in the pixel-domain image at which the detectable feature is located;

analyzing the pixel-domain image at the location to determine a value for the detectable feature;

accessing additional detection metadata indicating a comparison value for the detectable feature;

comparing the determined value for the detectable feature with the comparison value; and determining payload information based on a result of the comparing.

53. The method of claim 25 wherein the predictive encoding of the image is intra-prediction, such that the actual reference is an intra-prediction reference.

54. The method of claim 25 wherein the different reference is an intra-prediction reference.

55. The method of claim 25 wherein the information identifying the actual reference includes a macroblock type field as used in H.264 or a related standard.

56. The method of claim 25 wherein the information identifying the actual reference includes an intra-prediction mode indicator, as used in H.264 or a related standard.

* * * * *